United States Patent
Egger et al.

(10) Patent No.: US 12,301,760 B1
(45) Date of Patent: May 13, 2025

(54) SYSTEM AND METHODS FOR FACILITATING THERAPEUTIC COMMUNICATION

(71) Applicants: Cole Egger, Dallas, TX (US); Jason Alan Franzen, Dallas, TX (US)

(72) Inventors: Cole Egger, Dallas, TX (US); Jason Alan Franzen, Dallas, TX (US)

( * ) Notice: Subject to any disclaimer, the term of this patent is extended or adjusted under 35 U.S.C. 154(b) by 0 days.

(21) Appl. No.: 17/386,481

(22) Filed: Jul. 27, 2021

Related U.S. Application Data

(63) Continuation of application No. 16/985,418, filed on Aug. 5, 2020, now abandoned.

(60) Provisional application No. 62/915,778, filed on Oct. 16, 2019, provisional application No. 62/897,268, filed on Sep. 7, 2019.

(51) Int. Cl.
*H04M 3/523* (2006.01)
*H04M 3/42* (2006.01)
*H04M 3/51* (2006.01)

(52) U.S. Cl.
CPC ..... *H04M 3/5233* (2013.01); *H04M 3/42221* (2013.01); *H04M 3/5116* (2013.01)

(58) Field of Classification Search
CPC ........... H04M 3/5233; H04M 3/42221; H04M 3/5116
See application file for complete search history.

(56) References Cited

U.S. PATENT DOCUMENTS

| 7,752,080 | B1 * | 7/2010 | Greener | G06Q 10/10 |
| | | | | 705/26.1 |
| 2011/0304629 | A1 * | 12/2011 | Winchester | G06T 13/40 |
| | | | | 345/473 |
| 2018/0109760 | A1 * | 4/2018 | Metter | H04N 7/155 |
| 2019/0228845 | A1 * | 7/2019 | Moturu | G16H 20/40 |
| 2019/0325897 | A1 * | 10/2019 | Liu | H04M 3/5175 |

OTHER PUBLICATIONS

A Member's Eye View of Alcoholics Anonymous (Year: 1970).*

* cited by examiner

*Primary Examiner* — Phung-Hoang J Nguyen
(74) *Attorney, Agent, or Firm* — Jeffrey Roddy

(57) ABSTRACT

A System and Method for Facilitating Therapeutic Communication includes hyper matching a caller wishing to discuss personal issues to a sympathetic listener who has experience with the discussion topic chosen by the caller. Hyper matching includes audio recordings of listeners who are pre-screened by the system according to user metrics, that are available for caller review to further match the caller to a preferred listener. A recording of the call is available for review by pre-matched listeners ensuring two-way matching. An intelligent assistant is capable of monitoring a caller-listener conference interaction and providing real time feedback to the listener in a mentoring process. Identities of the caller and listener are shielded to protect all participants.

6 Claims, 32 Drawing Sheets

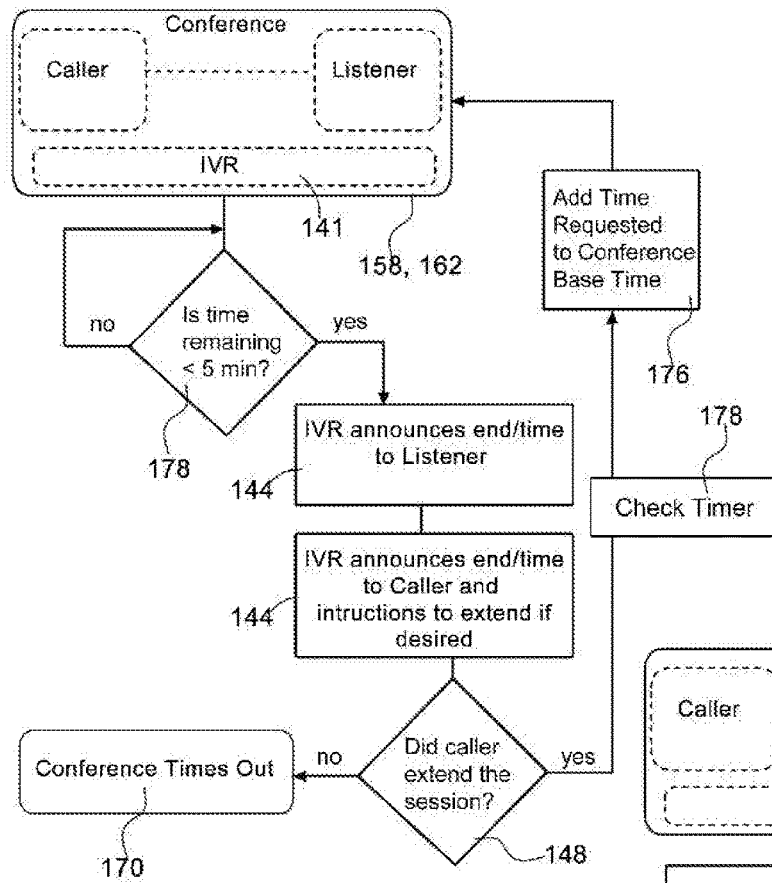
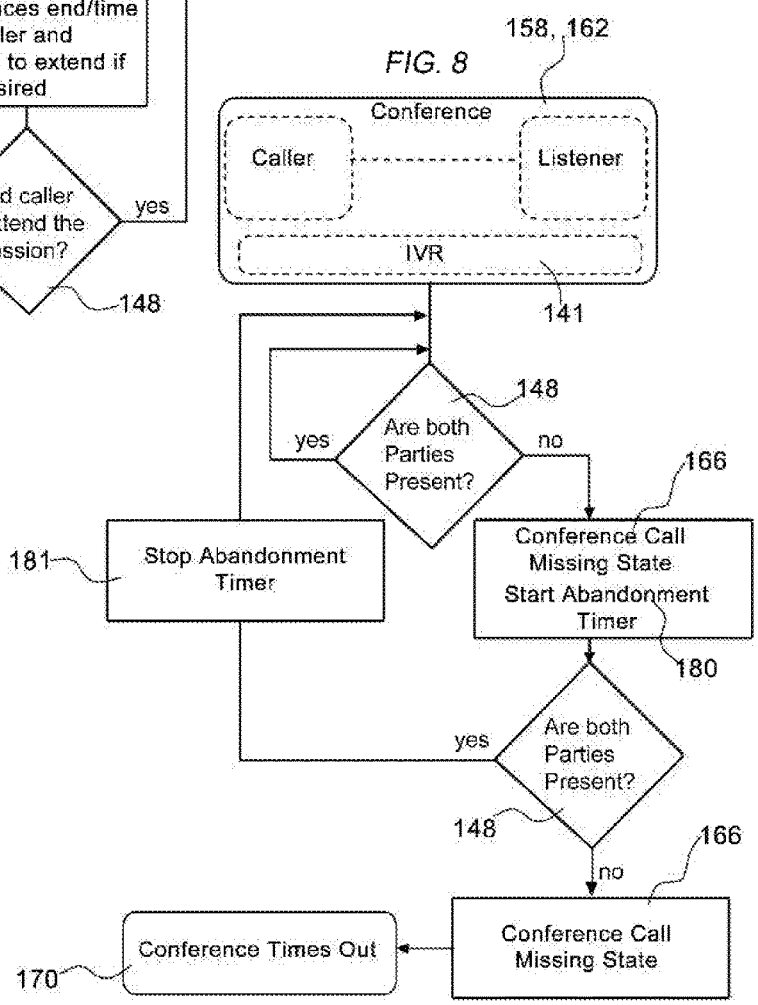

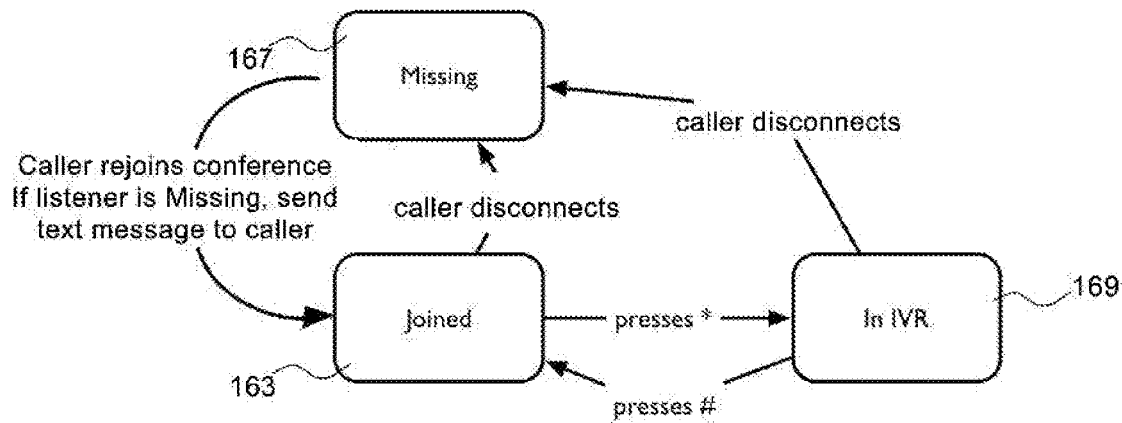
FIG. 10  Caller Status
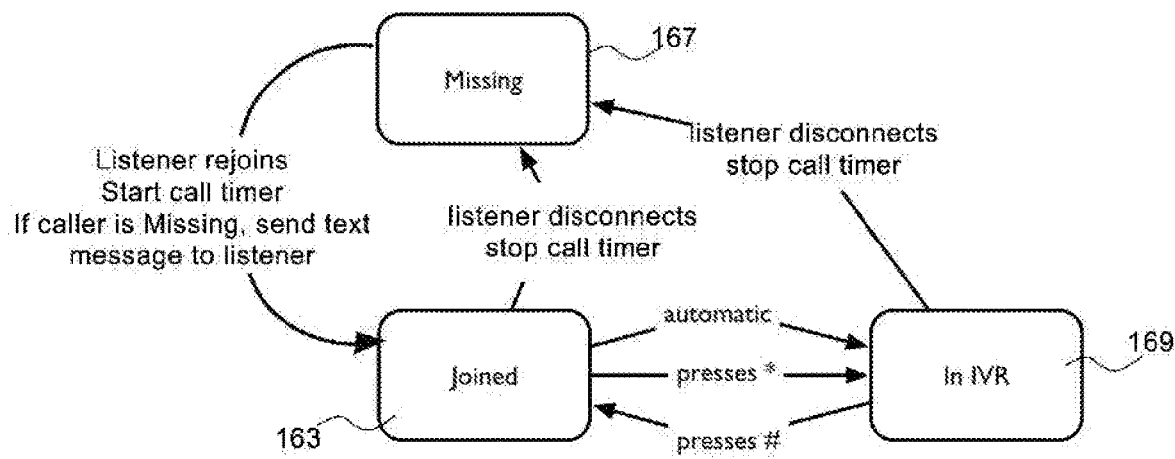
FIG. 11  Listener Status

Caller When on a Call

| Event | Reasons | Resolution |
|---|---|---|
| Unexpected disconnect | Accidental hang up | Call back to rejoin |
| | Cellular problem | Call back when problem clears |
| | Phone battery dies | Plug phone in to charger and call back |
| Decide to end call | Doesn't want to continue | Hang up |
| | Listener behavior is unacceptable | Hang up - flag in web app afterwards |
| Decide to leave call | Temporarily can't stay on call | Hang up and call back when ready |
| Wants to extend call | Enjoying discussion | * to IVR menu - select 1 – Extend Call |

FIG. 12

Listener When on a Call

| Event | Reasons | Resolution |
|---|---|---|
| Unexpected disconnect | Accidental hang up | Call back to rejoin |
| | Cellular problem | Call back when problem clears |
| | Phone battery dies | Plug phone in to charger |
| Decide to end call | Caller behavior is unacceptable | Hang up - flag in web app afterwards |
| | | * to IVR menu - select 9 – Escalate |
| Decide to leave call | Temporarily can't stay on call | Hang up - flag in web app afterwards that caller should be refunded |
| | | Less than 15 minutes - hang up and call back when ready |
| Agrees to call extension | Has time and willingness to continue | Automatically taken to IVR when Caller extends. Listener must confirm extension |

FIG. 13A

Listener Donations/ Discount Coding

| Event | Reasons | Resolution |
|---|---|---|
| | Caller wants free session | Partner logs in and creates a one-time use discount code (random) for the person which is emailed or texted to them as a link |
| Caller receives free session link | Generated and sent by partner to person in need | Click on link which starts sign up process and/or automatically fills code on start of their next call |
| | Listener wants to donate proceeds to partner | Set up partner in their profile with a selected percentage |
| | Listeners On Call wants to promote the service. | Create human readable discount code. |

FIG. 13B

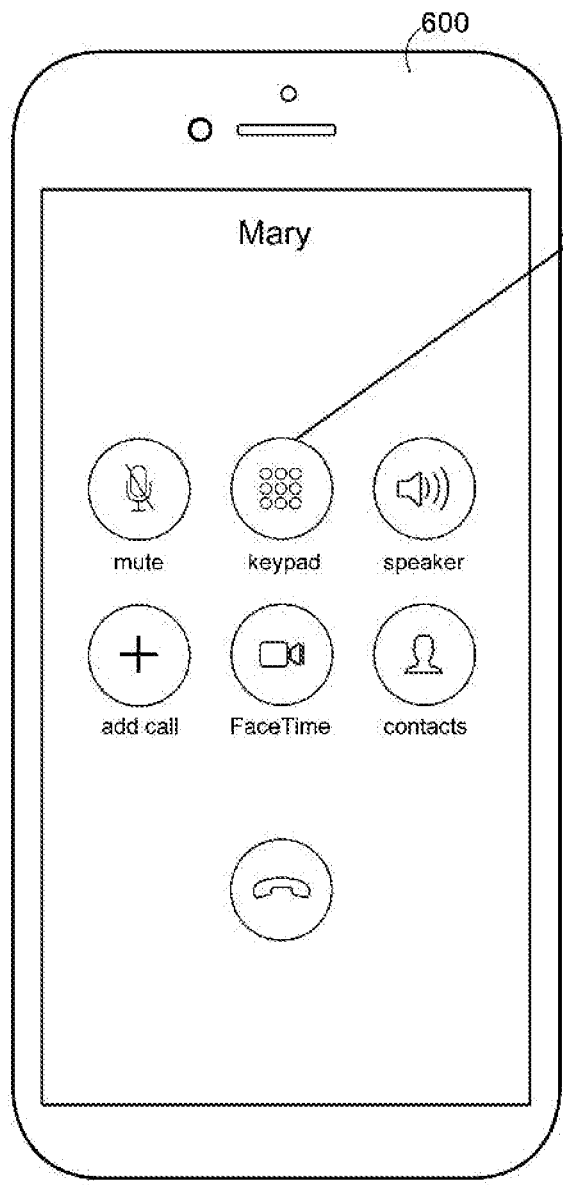
*FIG. 15A*
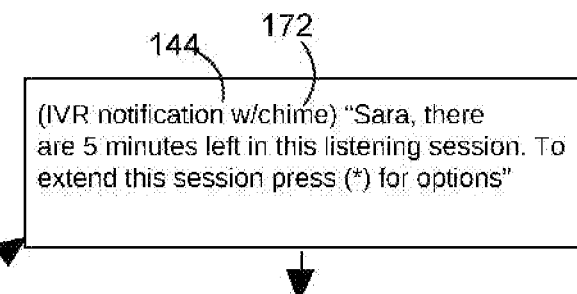
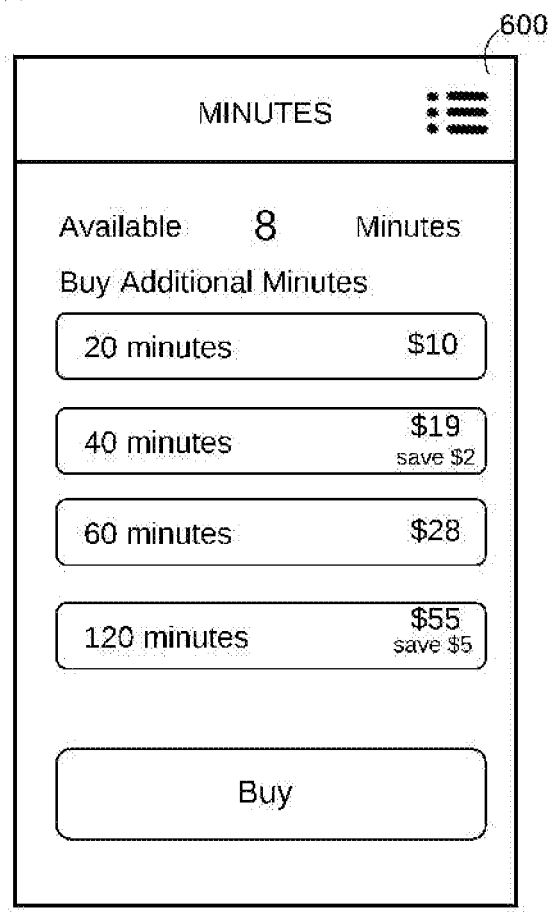
*FIG. 15B*

SYSTEM AND METHODS FOR FACILITATING THERAPEUTIC COMMUNICATION

The present invention relates to telephonic communications and more specifically, systems and methods to facilitate therapeutic interactions between individuals.

BACKGROUND OF THE INVENTION

Millennials are more likely to talk about mental health than their parents or grandparents. Despite decreasing stigma among certain age groups and the willingness of individuals to discuss problems, barriers to treatment remain.

According to a 2015 report by the Center for Collegiate Mental Health, as students have encountered more mental health problems, they have sought help in record numbers. Between the fall of 2009 and spring of 2015, the number of students who visited campus counseling centers increased by more than 30 percent, while college enrollment climbed just 5 percent.

According to a 2017 report from the Association for University and College Counseling Center Directors, nationwide, students typically have to wait almost seven business days for their first appointment with a college counselor.

High fees for counseling services can discourage potential clients. In a 2018 study conducted by the Barna Group, when participants were asked which two attributes are most important to them in choosing a counselor, the plurality selected affordability (46%) as the main factor.

In recent times, a global pandemic has restricted normal activities such as group sports, communal worship, etc., and record number of people under quarantine conditions are reporting depression and loneliness. Healthcare workers and other first line responders are especially affected.

Although applications exist that permit a user to speak online with a licensed therapist or counselor at a cost generally less than an office visit, for many, online hourly rates are still prohibitively expensive. Furthermore, whether a therapist might have experiences in common with the user is not factored into the process.

Due to the personal nature of such interactions, it is vitally important that a caller in need of a sympathetic listener is able to feel comfortable with and trust his or her listener. Phone conferences rely solely on the sense of hearing. Emotions evoked by vocal characteristics of an individual such as tone and cadence are highly subjective. Responsive voice characteristics of a listener may place one caller at ease and another on edge. Relying only on static profiles and possibly a photo, it can be difficult for a caller to trust a listener's self-description and select a listener ideal for his or her needs.

It would be desirable to provide a system that facilitates potentially therapeutic interaction between those wishing to discuss a difficulty and those who are willing to listen.

It would be desirable if the foregoing system were configured to match individuals encountering difficulties with others who may share a history of having overcome similar difficulties and who are willing to provide a sounding board.

It would be desirable if the foregoing system were to provide a space for online interactions on demand and at generally affordable rates.

It would be especially desirable if such a system were to provide a UI (user interface) to connect a caller with a listener in minutes.

It would be further desirable if such a system were to provide a UI for callers to pre-screen matched listeners, for example, if the system were to provide representative recordings of system-matched listeners to callers. In such a system, recordings made by callers may likewise be pre-screened by system-matched listeners.

A general example implementation according to the present invention comprises a cloud-based application that includes processes to facilitate therapeutic interactions between individuals. Callers are individuals requesting to discuss a particular topic who are matched with a one or more listeners who have relevant experience with a caller's selected topic. The application provides anonymity such that identities of the listener and caller are shielded from one another by aliases and listeners are generally prohibited from disclosing their identity. Non-limiting examples include: a caller going through a divorce reaching out to a listener who has gone through a divorce; a caller dealing with grief reaching out to a listener who shares the experience of losing a family member; a caller undergoing chemotherapy wishing to talk to a cancer survivor; a struggling business owner reaching out to discuss the difficulties and challenges with someone who faced similar challenges. An example of such a general example implementation providing therapeutic interaction between individuals may comprise the steps of: providing an interface for a plurality of listeners to register and input an instance of one or more topics for discussion; providing an interface for a plurality of callers to register and input a second instance of one or more topics for discussion; providing a caller UI that includes means for a requesting caller from the plurality of callers to submit a conference request; matching the second instance of one or more topics from the requesting caller with that of the first instance of one or more topics to obtain a subset of matched listeners; notifying the subset of matched listeners of the conference request by the requesting caller; providing a listener UI including: a listener control; e.g., dashboard, configured to display information provided by the requesting caller; and, a mode to accept the conference request; providing a caller UI including: a list of one or more accepting listeners; a control configured to playback a selected recording from each accepting listener; a mode to select a listener from the accepting listeners; and, creating a telephonic conference between the requesting caller and the selected listener. What follows are various aspects that are combinable with the general implementation or with any other aspect.

In a second aspect combinable with any other aspect, the application includes an interface enabling a caller to enter topic(s) for discussion and describe his or her difficulties.

In a third aspect combinable with any other aspect, once a caller has completed registration including acceptance of terms and conditions of the application, one or more available and accepting listeners who share a similar experience or who possess relevant experience may be presented to the caller for selection purposes. The term "accepting" as used herein, means application-matched listeners who have been notified of a caller's request, reviewed the requesting caller's information; e.g., personal information, a voice recording provided by the caller, etc., and accepted the opportunity to participate in the interaction within a predetermined length of time.

In a fourth aspect combinable with any other aspect, the system may limit the number of accepting listeners presented to a requesting caller's UI in list form, which may be helpful in cases where the caller is anxious and could be overwhelmed by excessive choices.

In a fifth aspect combinable with any other aspect, the application may not display a list of accepting listeners until a predetermined minimum of available listeners have accepted the listening opportunity.

In a sixth aspect combinable with any other aspect, as part of the selection process, callers may sample voice recordings provided by the accepting listeners in order to select a listener right for his or her needs. Details included in listener profiles such as gender, credentials (if any), fees, ratings, geographic location, etc., may also assist callers in selecting an appropriate listener for his or her needs.

In a seventh aspect combinable with any other aspect, matched listeners may review a requesting caller's recording before accepting a listening opportunity.

In an eighth aspect combinable with any other aspect, once a requesting caller selects an accepting listener, the selected listener is informed by the system of the selection and the listener initiates a call to the caller after a short time.

In a ninth aspect combinable with any other aspect, listener responsiveness may be monitored. The system application may require a listener to initially respond to conference requests in a minimum amount of time; e.g., 1 minute, in order to participate in the listening opportunity.

In a tenth aspect combinable with any other aspect, initial contact between the caller and listener may be used to schedule a more lengthy session time. In some cases, a selected listener may not be immediately available for a conference. In cases where a caller has immediate need and for whatever reason a selected listener cannot provide the service, the system may recommend another listener who previously accepted.

In an eleventh aspect combinable with any other aspect, during or after a conference, listeners may take notes to provide a general assessment of the interaction. Such records may be available to other listeners interacting with the same caller in the future. Consistent with terms of service, conferences may be monitored by a human or intelligent assistant (IA) whereby real time mentoring feedback may be provided the listener and the interactions including the feedback recorded and stored for a predetermined time; e.g., 14 days, after which, the recordings and notes (if any) may be destroyed. Further, a monitoring intelligent assistant is capable of blocking audio if a caller or listener for example speaks his or name or otherwise attempts to provide identifying information.

In a twelfth aspect combinable with any other aspect, a listener while engaged in a conference may decide that additional help is required to respond to a caller's needs and access an application menu that allows the listener to bridge a call to a service such as a suicide crisis hot line, fire and rescue or various social services.

In a thirteenth aspect combinable with any other aspect, the application may notify callers engaged in a conference via text message or IVR (Interactive Voice Response) or IA of time remaining and provide instructions on how to extend the conference duration.

In a fourteenth aspect combinable with any other aspect, the application may initially set conference call duration according to caller preferences, continually monitor the time and provide a means for a caller and listener to agree verbally or press a key in real time to extend the conference if desired.

In a fifteenth aspect combinable with any other aspect, any caller initiated request to extend conference duration by whatever means is subject to listener approval confirmed through a listener UI or IVR menu.

In a fifteenth aspect combinable with any other aspect, caller and listener communication interfaces provided by the application may include: http forms, SMS with and without links, MMS, IVR, IA or any combination thereof.

In a sixteenth aspect combinable with any other aspect, the cloud-based application includes at least a hosting service, notification service, cloud email handler 114, a cloud communications platform 116 and a cloud payment processor 118, any of which may be provided by third party services 112 (e.g., Amazon Web Services®, Firebase®, Postmark®, Twilio®, Stripe®, etc.) that have suitable APIs integratable by the cloud-based application 101. Additional third party services 112 may be leveraged to provide background checks and teaching and certification opportunities (e.g., Checkr®, Thinkific LMS®, etc.) for prospective listeners.

In a seventeenth aspect combinable with any other aspect, instead of; or in combination with text and IVR communication between the application and users, conference requests, notifications and communication outside of the actual listening process may be managed instead by the intelligent assistant, while the underlying matching process and pre-screening process remain the same. In one example, a user would log in to the application and an intelligent assistant would guide them through the process of selecting a topic. Typically, the intelligent assistant would ask the caller to describe what is bothering them and then derive from the verbal description a more definite topic. An intelligent assistant might "listen" to a caller's (e.g., "Sara") description, and reply "Sara, it sounds like you're feeling lonely, do you want to connect to a listener who can help you with that?" If Sara says that she would like to connect, the intelligent assistant may ask a few more questions where the recording of the interaction would be available to prospective listeners. The intelligent assistant would initiate the matching process and notify the matched (human) listeners of Sara's request. A record of the human/IA interaction as a pre-screening process may be provided matched listeners. Similarly, the intelligent assistant may in some implementations listen in to caller-listener interactions and provide real-time feedback to the listener during a caller-listener interaction.

In an eighteenth aspect combinable with any other aspect, sponsorship; e.g., corporate sponsors, may provide a fund for particular purposes such as suicide prevention where as part of an awareness campaign, students or any other group may be provided with partially discounted or fully paid services.

BRIEF DESCRIPTION OF THE DRAWINGS

FIG. 7 is a diagram depicting an example conference extension process;

FIG. 8 is a diagram showing an example of conference state monitoring and conference time out;

FIG. 10 is a diagram showing various conference call states for a caller;

FIG. 11 is a diagram showing various conference call states for a listener;

FIG. 12 is a table depicting example caller actions and call options during a conference call;

FIG. 13A is a table depicting example listener actions and listener options during a conference call;

FIG. 13B is a table showing example processes for donating time to the system or to a particular caller;

FIG. 15A is a generalized depiction of a voice notification and accessing an IVR menu that prompts a caller that time is running out and provides a menu or key press option to purchase additional time;

FIG. 15B shows an example screen that offers Callers the choice of selecting additional conference call minutes in bundle form;

Figure 1A:
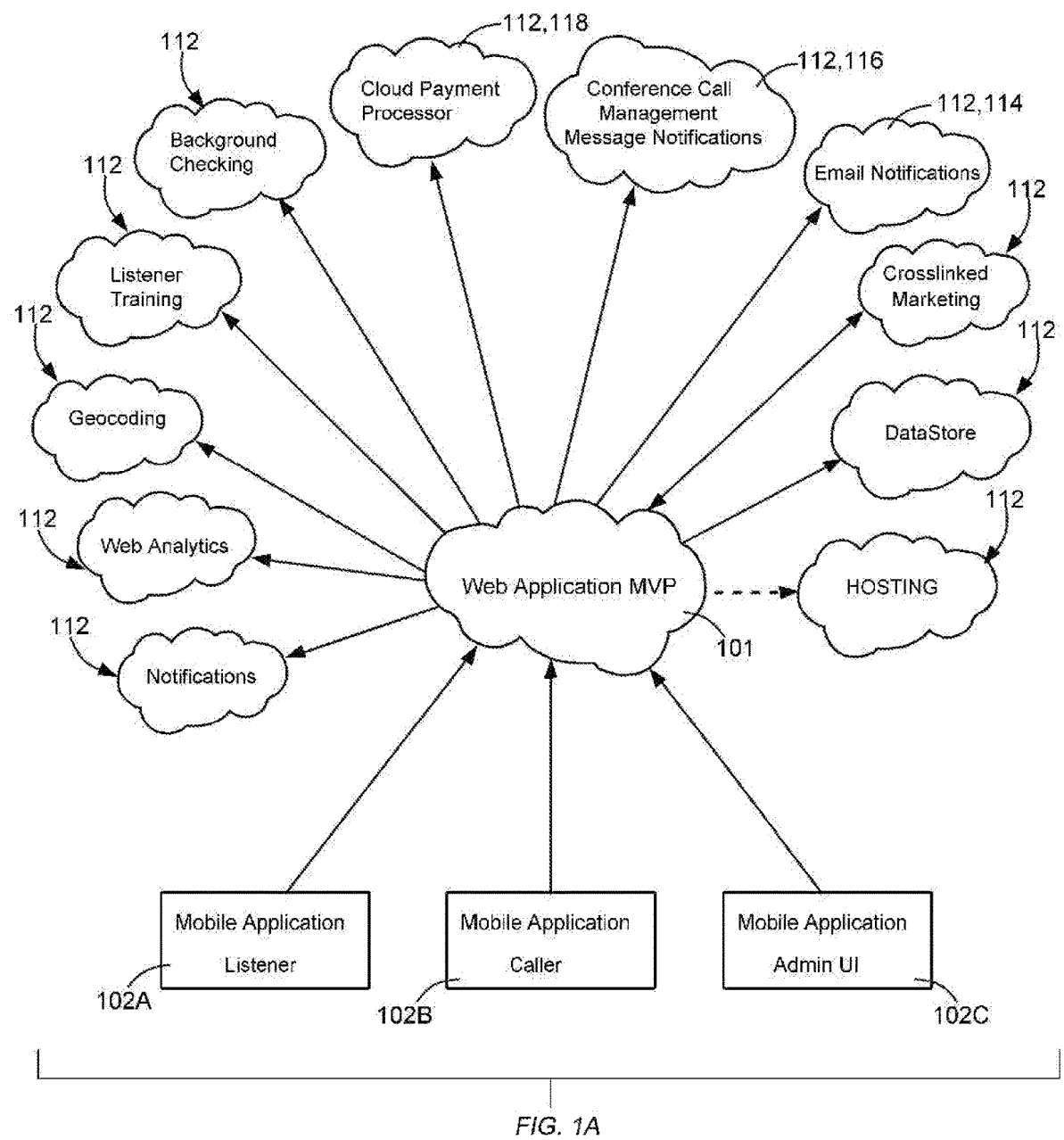
FIGS. 1A and 1B are generalized diagrams of a high level architecture and core features of a caller-listener matching process in an example implementation according to the present invention.

REFERENCES (101) application
(102) client instance/device
(112) third party process
(114) email handler
(116) communications platform
(118) payment processor
(120) forms handler module
(122) data handler module
(124) inbound link module
(125) outbound text module
(126) text notification with link
(128) notification of caller request
(132) notification of listener confirmation
(134) notification of listener selection
(136) caller declined message
(138) MMS with control
(140) IVR module
(141) IVR instance
(142) IVR menu
(144) IVR notification/prom pt
(146) conference recording module
(148) call management module
(154) bridge calls
(156) initiate conference
(158) active conference
(162) conference normal state
(163) caller/listener state joined
(164) conference empty state
(166) conference missing state
(167) caller/listener state missing
(168) conference emergency state
(169) caller/listener state in IVR
(170) conference times out
(172) welcome message/chime
(174) conference end
(176) extend conference
(178) conference timer
(180) start abandonment timer
(181) stop abandonment timer
(182) third party
(183) emergency resolution
(200) caller dashboard
(202) call identification controls
(204) caller contact controls
(206) caller payment controls
(208) caller topics listing
(210) caller duration control
(212) caller recording control
(216) listener recording playback control
(217) age preference for listener
(218) caller religious preference
(220) request conference control
(221) listener rates control
(222) listener ratings control
(224) caller terms and conditions control
(225) listener acceptances list
(228) listener feedback control(s)
(230) select listener control
(300) listener dashboard
(302) listener identification controls
(304) listener contact controls
(306) listener topics listing
(308) times available control(s)
(310) listener recording control
(312) religious preference control
(314) payment processor control
(316) credentialing control(s)
(318) listener insurance confirmation control
(322) listener terms and conditions control
(323) surge pricing option control
(324) caller recordings playback control
(326) accept caller request control
(327) flag request control
(328) decline request control
(328) caller feedback control
(330) comments control
(400) caller
(500) prospective listener
(502) matched listener
(504) accepting listener
(505) selected listener
(506) declined listener
(508) (IA) intelligent assistant
(509) intelligent assistant pre-screening
(600) communications device

DETAILED DESCRIPTION OF THE INVENTION

A "system" may include one or more cloud-based components, one or more client based components or integrate the API Is of one or more third party services. The term "online" refers to remote communication and encompasses internet and cellular communication means. "Device" means any wired or wireless computing device capable of remote communication. The term "therapeutic" as used herein means beneficial or remedial. The term "caller" refers to a registered user of the present system wanting to speak about a particular subject. The term "listener" means a person having relevant life experience that is interested in assisting callers having similar experiences by serving as a sounding board. The terms "session" and "conference" refer verbal interaction between a caller and listener. The term "topic" means life experiences relevant to callers, e.g., aging, divorce, job loss, situational depression, worry about economic insecurity, body image, illness. The term "users" includes at least callers, listeners and admins. The term "process" means a rules driven sequence of actions, some of which is automated through programming. "Module" or "mode" as used herein means part of a program that encapsulates code and data to implement a particular functionality, a process, and includes one or more interfaces that let clients or other modules access its functionality. The term "control" or generally refers to objects such as text fields, buttons, links, data populated lists, etc., accompanying a user interface "UI" that collect data and/or initiate one or more actions of a process. The term "matched" refers to a subset of listeners selected from a set of prospective listeners through an automated process that includes caller preferences. The term "accepted" or "accepting" means a matched listener who has confirmed availability and accepted a request to contact a caller within a set length of time and to participate in a listening conference for a requested duration. The term "pre-screen" refers to a prospective listener reviewing a caller's request which may include the review of caller profile information and audio recording(s) as a preliminary step to accepting a caller's request and becoming an available listener, or, a caller reviewing profile information and recordings accompanying a list of available listeners as a preliminary step to final selection. The term "interactive voice response" encompasses simple automated voice response or sophisticated artificial intelligence, e.g., an "intelligent assistant." Unless otherwise explained, any technical terms used herein have the same meaning as commonly understood by one of ordinary skill in the art to which this disclosure belongs. The singular terms "a," "an," and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." All publications, patent applications, patents, and other references mentioned herein are incorporated by reference in their entirety for all purposes. In case of conflict, the present specification, including explanations of terms, will control. In addition, the materials, methods, and examples are illustrative only and not intended to be limiting. Portions and features of some implementations may be included in, or substituted for, those of other implementations. Implementations set forth in the claims encompass all available equivalents of those claims.

Implementations according to the present invention may include one or more clients and one or more cloud based applications. Cloud-based application(s) of the system may integrate the APIs of a one or more third party 112 cloud-based applications or services (e.g., Twilio®, Amazon Web Services® (AWS), Stripe Connect®, Postmark®, Thinkific LMS®, Checkr®, Google Analytics®, Google Data Studio®, Geocodio, Firebase Notifications®, Microsoft AI® or Google AIR, etc.,). Communication protocols for client-cloud or client-server communications such as SOAP and REST are also well known. Caller and listener profile data held in a cloud environment can include any data structure or relational database, whether typical SOL based or NoSQL. Datastores may include one or more relational databases, which may in turn contain objects and/or references to objects such as pictures, videos, audio recordings, documents, notification objects and annotations. Databases suitable for practicing delivery aspects of the present invention may be, but are not limited to: postgres, mysql, Oracle, Mssql, Cassandra, Riak, Redis, and document-oriented databases such as BaseX, Cloudant, MongoDB. Actions taken on any client-side application will be matched with corresponding changes in a cloud environment by customary means including asynchronous or synchronous communication using known communications protocols between the local application and one or more servers in a cloud. It should be understood that communication can be provided by VOIP and/or cellular internet connection means integrated into an application component loaded on a mobile phone or computer in communication with a cloud-based component. Depending on WiFi service availability, processes may toggle from VOIP to cellular protocols or vice versa.

Figure 1B:
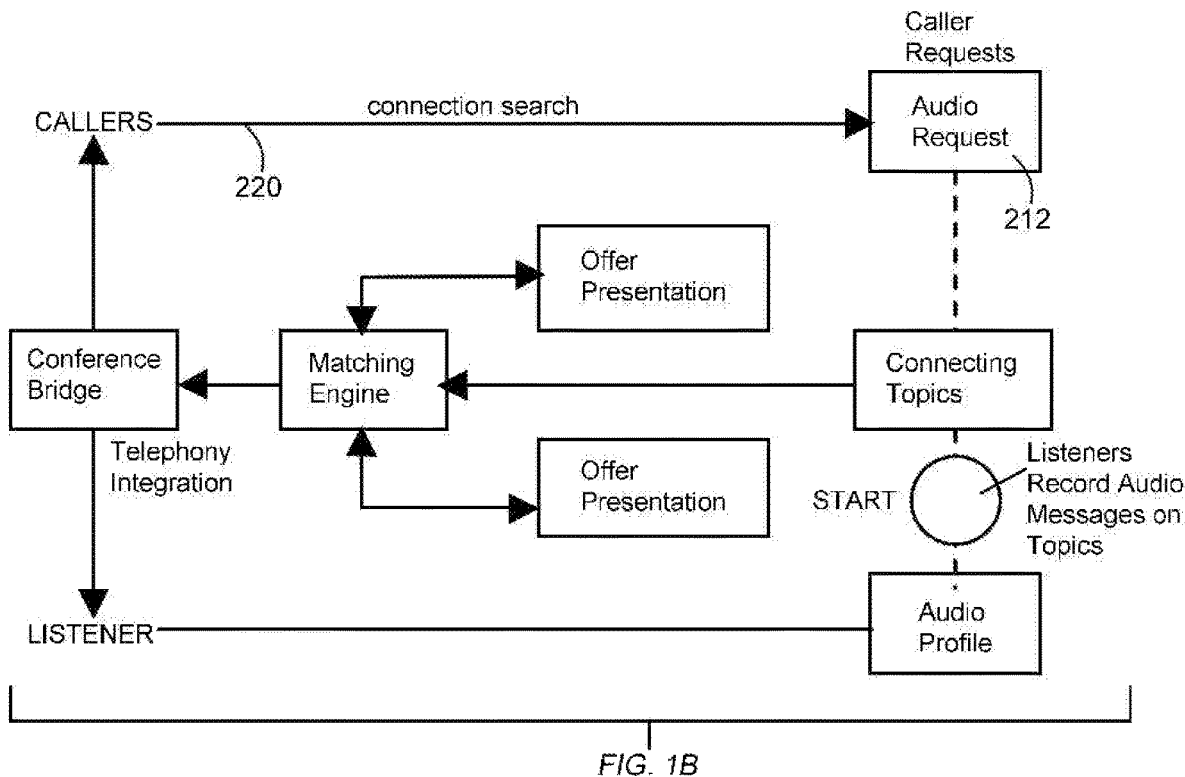

FIG. 1 depicts basic components of a system for facilitating therapeutic communication comprising a cloud-based application 101 that includes a cloud payment processor 118, cloud communications platform 116 and cloud emailer 114 any of which may be provided by third party services 112 having APIs that may be integrated with the cloud-based application with which various devices 600 can communicate. FIG. 1B is a generalized diagram showing the process of matching a listener with a caller based on caller preference and the review of a caller recording that may be a solo recording or a recording of an interaction with an intelligent assistant.

Figure 2:
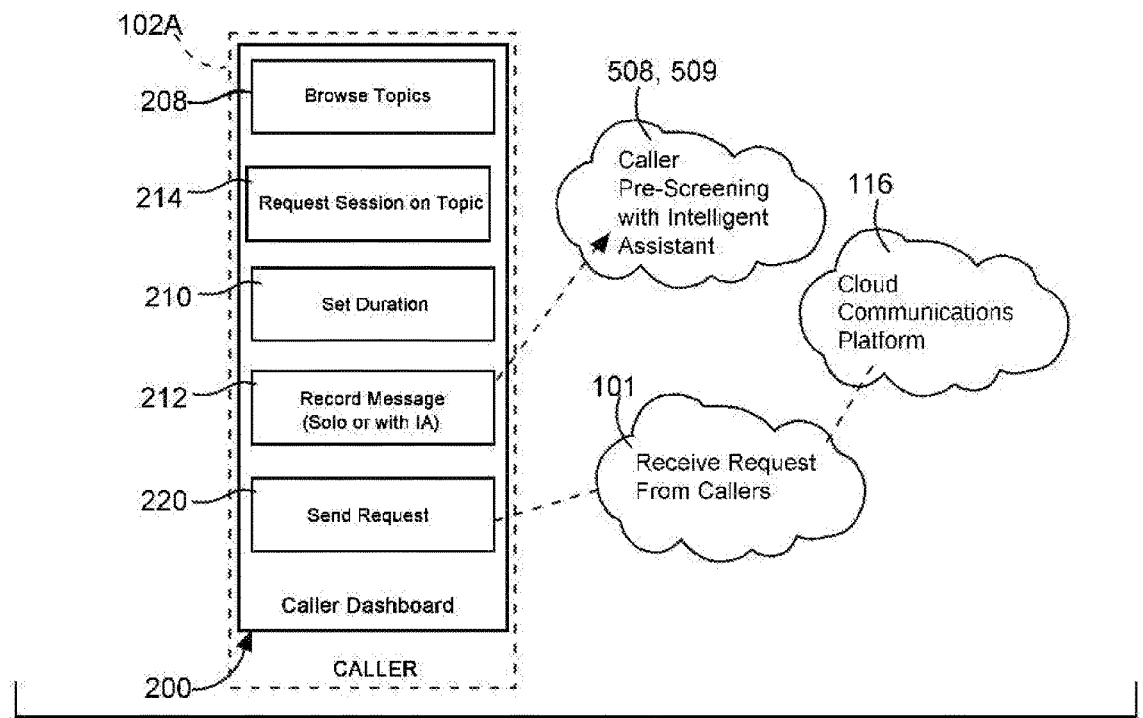
FIG. 2 is a generalized diagram depicting an example caller conference request process.

FIG. 2 is a generalized diagram of an initial conference request made by a caller using a caller dashboard UI 200 whereby the caller browses a conference topics listing 208, selects a conference topic 214, sets a duration 210 for the conference which may be in 15 minute increments, and records 212 a short message relevant to the topic, experience or personal difficulty. In some implementations the caller's recording may be an interaction between the caller and an intelligent assistant 508, 509. Other controls (e.g., FIG. 17) available to a caller may include preference settings for listener age 217, listener gender 218 and religious preference 219 which are used by the application to match a set of prospective listeners to a caller requested topic. Once the caller has inputted his or her preferences, the conference request 220 is sent to the cloud-based application 101. It should be understood that a caller may register, submit his or her preferences and log in at any time to submit the conference request. Any of the above caller actions may be performed by form based controls shown in (FIGS. 17-21).

Figure 3:
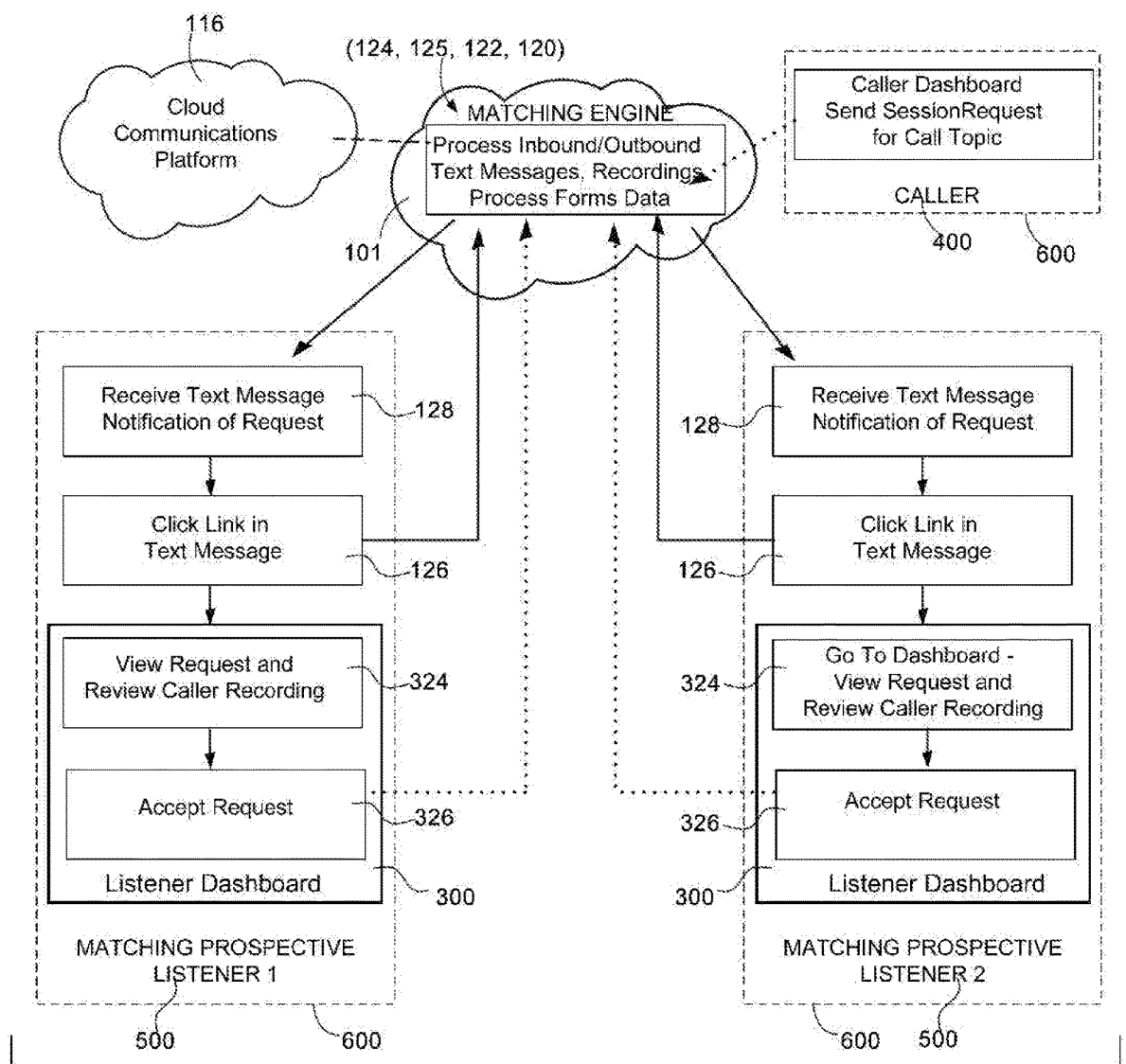
FIG. 3 is a generalized diagram depicting an example of a listener notification process once a caller's conference request is received and a query for matching listeners has been executed.

FIG. 3 is a generalized diagram depicting an example of a listener notification process after a caller's conference request 220 is received and a query for matching listeners has been executed by the matching engine of the application data handler module 122 processing a caller-listener matching query against a database wherein at least some of the parameters are the caller's listener preferences. In the example shown, Listener 1 and listener 2 are matched with the caller. Both matching listeners receive automated text notification of the caller request 128 processed by an outbound text module 125 including a URL link 126 that each matched listener may click to confirm receipt. The link may leverage a REST API and include information that identifies the username, conference ID and a time stamp typically in a GET method form by the cloud-based application to confirm receipt. Information obtained by the clicked link is handled by an inbound link module 124 and the data handler module 122. In the particular example shown, solid arrows represent information retrieved by the application via SMS or MMS URL link, while dashed arrows indicate an http forms post request processed by a forms handler module 120 and data handler module 122. In some implementations, depending on the number of matched results, not all matching listeners may be notified of the caller request. Once the listeners have confirmed receipt by clicking on a notification link 126, one or more listeners may accept the request 326 through a listener dashboard UI 300 after review of the caller's recording 324 which may include an interaction between the caller and an intelligent assistant and the caller profile 324. In some implementations, prospective listeners may submit times and dates of availability 308 which may exclude them from some listening opportunities. While there may be no implied obligation to accept when notified of a caller request, repeated instances of unavailability may lower a listener's rating 222 or may otherwise unfavorably flag the listener. In the example, one or more previously matching listeners 502 have accepted 326 the caller request 220 via dashboard 300 which means they accept 504 to take part in an additional caller selection process. In some cases, a listener may flag and comment on a received conference request if he or she has knowledge that the request is inappropriate for whatever reason.

Figure 4:
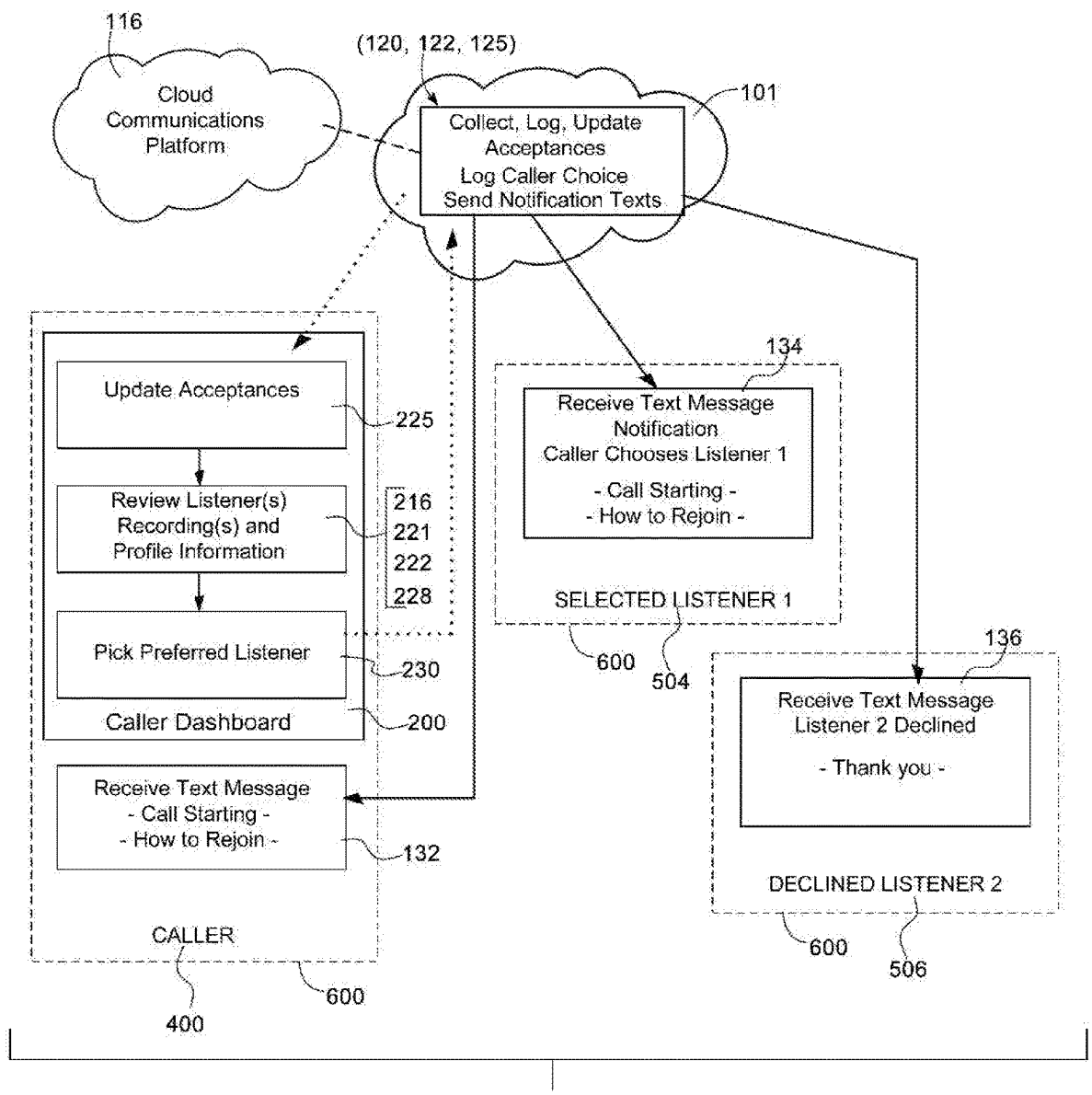
FIG. 4 is a generalized diagram depicting an example process of updating a caller's UI showing available listeners and handling a caller selection of an available listener.

Moving to FIG. 4, the requesting caller's dashboard 200 is updated by the forms handler 120 and data handler 122 to reflect the acceptances. The caller's dashboard includes in a list 225 of accepting listeners, a listener recording playback control and may include a fee rate listing 221 and ratings listing 222. Persons having skill in the art will appreciate that one or more of the foregoing controls and lists may be combined, for example, in a scrollable table view having columns and rows and links, buttons, etc., and appreciate that positioning, size and data formatting will naturally vary according to various UI implementations, and different devices 600. Once the caller 400 has reviewed the listing of accepting listeners 225 with the option to playback 216 listener recordings, the caller selects his or her preferred listener 230. The application receives the caller's selection and using the communications platform 116, sends a text message 134 via the outbound text message module 125 notifying the selected listener of the caller's selection with instructions on call starting and how to rejoin the conference if disconnected. Declined listeners 506 are sent notification and a thank you message 136.

Figure 5:
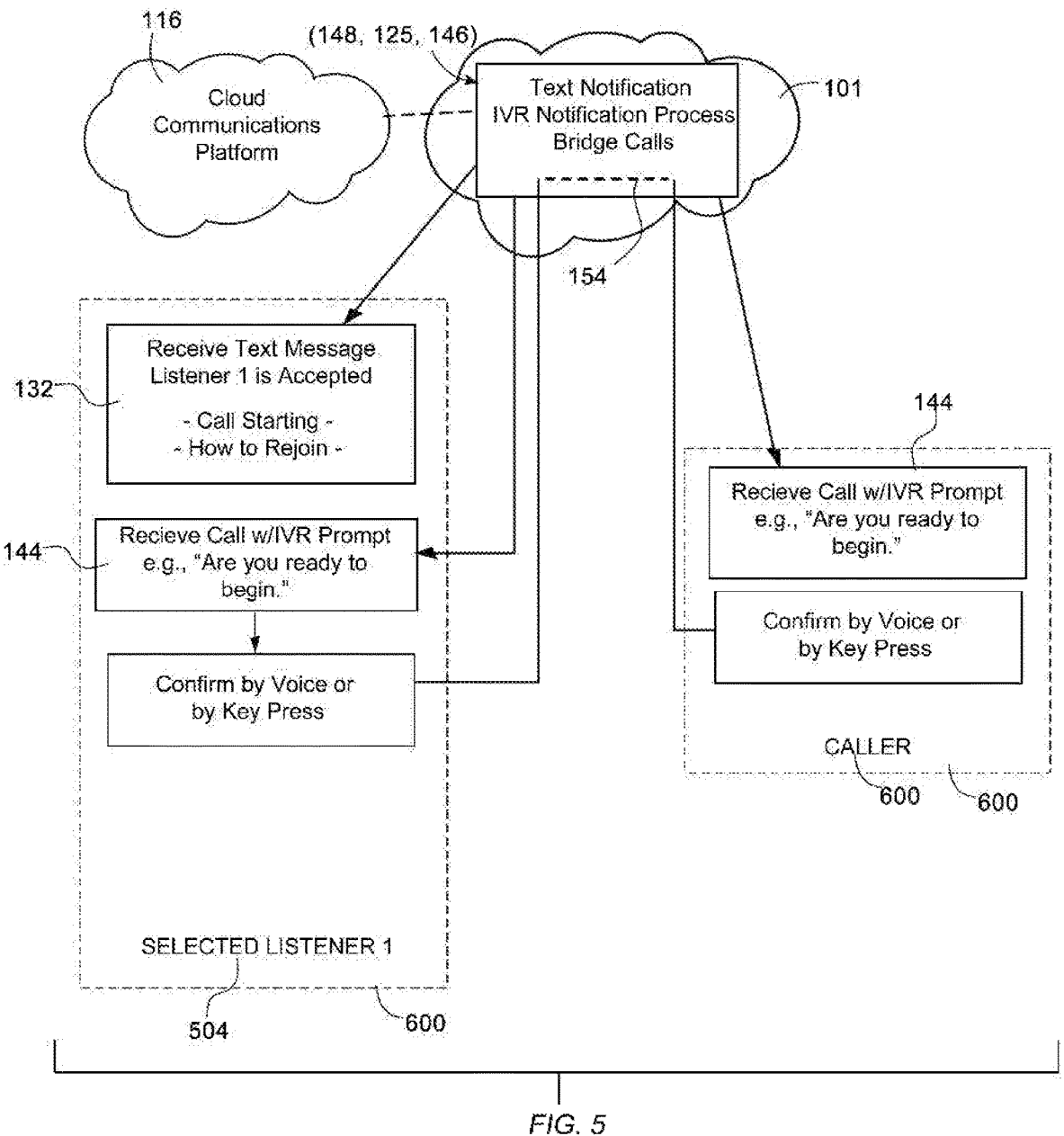
FIG. 5 is a generalized diagram depicting an example call confirmation notification process, conference initiation and call bridging process.

FIG. 5 is a generalized diagram depicting an example call confirmation notification process, conference initiation and call bridging process. The requesting caller receives a notification of listener confirmation 132 letting them know that the selected listener 505 is ready to begin the conference. The caller and listener each receive a phone call with an IVR prompt 144 asking whether they are ready to begin the conference and includes instructions for confirming conference readiness by voice or keypress. When the caller and listener have confirmed readiness, the call management module 148 bridges the calls 154 to create the conference 158. At any time in the conference, the caller or listener may access an IVR menu 142 that may include options to extend the conference, terminate the conference or request a third party participant by voice command or key press. Accessing the IVR menu may suspend interaction between conferencing parties.

Figure 6:
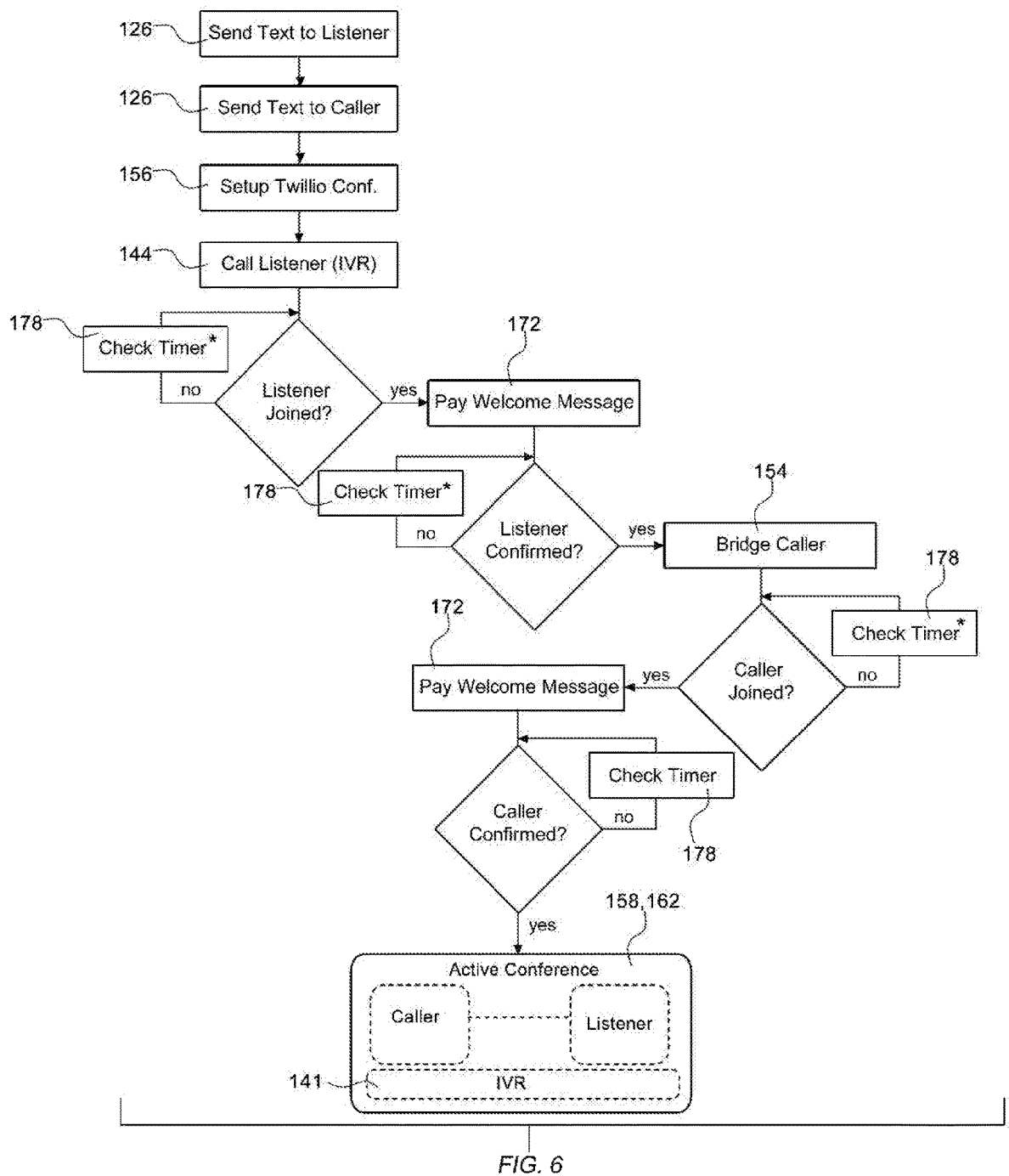
FIG. 6 is a more detailed diagram showing the steps of an example conference initiation process.

FIG. 6 is a more detailed diagram showing an example conference call creation. Once a caller has selected a listener, application 101 leveraging the communication platform 116 sends a text message 126 to the listener and the caller notifying both that the conference is commencing. In the particular example shown, Twilio® is the communications platform and a Twilio® conference object is instantiated via twilio's API. In the example shown, the call management module 148 monitors to see whether the notified listener has joined the conference meaning that the listener's connection is active, but in standby. The listener receives an IVR prompt 144 that asks the listener to confirm they are ready to begin the listener-caller interaction by voice command; eg., "yes", "no", or key press. An analogous process happens with the caller's connection once the listener has been confirmed. The joining and confirmation processes are monitored by the call management module 148 which also monitors conference state and call state to ensure that maximum time allotted for joining or confirming is not exceeded by the listener or caller. If a listener fails to join for whatever reason, the caller is notified by text or voice of the problem and the application will try and locate another listener for the caller. If the caller fails to join or confirm, the application will first send the caller a text message, IVR prompt or automated call to determine what the problem might be. If a participant fails to join or confirm within a prescribed time, the conference timer 178 function inform the call management module to start an abandonment timer 180 which may be of 15 minutes duration, after which the conference times out 170. In a normal scenario, both parties are successfully connected to the conference 158. When a listener or caller has joined, or rejoined, prior to the expiration of the abandonment timer, the call management module will stop the abandonment timer and the conference start or recommence for the allotted time remaining. A welcome message or chime 172 may inform all participants of his or her presence. When a listener or call disconnects, the other participant(s) may be notified by IVR 144.

Moving to FIG. 7, a diagram depicting an example conference extension process includes an active conference 158 in a normal state 162 with all participants. When the time remaining in the conference, as determined by the time monitor 178 is less than 5 minutes (or some other predetermined length of time), the IVR may chime 172, notify the caller 144, and provide instructions for the caller to extend the call. The caller may enter the IVR menu 142 and request to extend the call by voice command or key press. The IVR menu may be thought of as a key press or verbally navigable menu of options that may be accessed at anytime during a conference by pressing a predetermined key such as the star key, anytime in the conference by either participant. Options in the IVR menu may be executed by key press or verbal commands, and may include options to extend the conference time by 10 minutes, 15 minutes, 30 minutes, etc., which may be subject to listener approval, pause the conference, terminate the conference or invite another participant. The IVR menu of a listener has options absent in the caller's IVR menu. If a conference is extended as confirmed by the call management module 148 additional time is added to the conference base time. A caller IVR menu 142 may permit a caller to extend the session by 15 min increments. Whether or not the additional time is completely expended, the caller will be charged for the full 15 minutes to the credit card or payment method on file for the caller. In some implementations caller requests for extensions may be subject to the listener's approval. In some implementations, if the caller verbally agrees to the extension, a listener may note the caller agreement and extend the conference unilaterally. In some implementations, audio files of conference interactions may be recorded and stored for a predetermined length of time. In some cases, the caller may decline to extend the conference, in which case the call management module 148 allows the conference 158 to time out 170.

Figure 9:
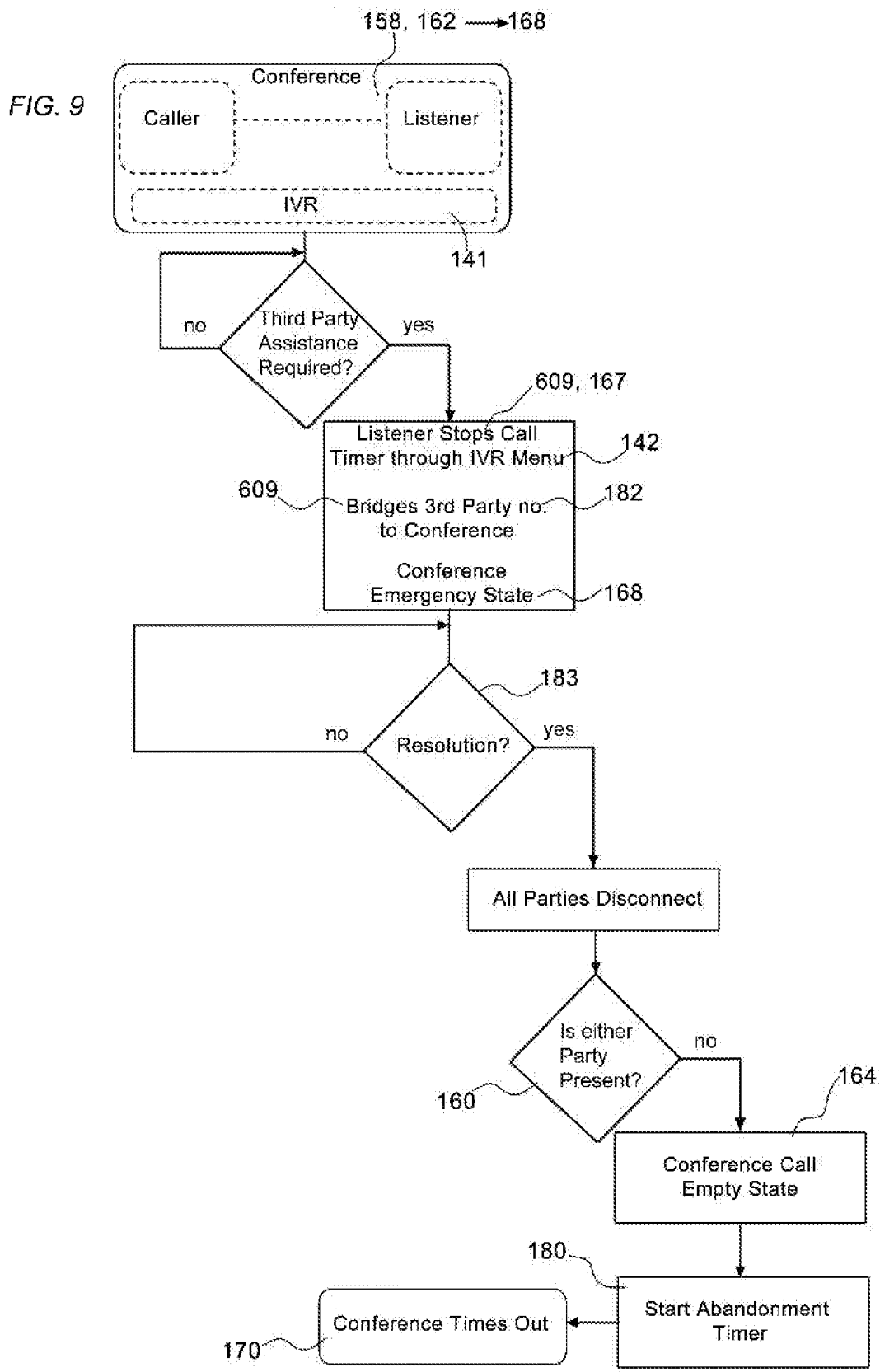
FIG. 9 is a diagram showing another example of conference state monitoring and conference time out.

Referring generally to FIGS. 8 and 9, active conferences 158 may have a normal state 162, missing state 166, empty state 164 or emergency state 168, monitored by the state function of the call management module 148. In the normal state 162 both caller and listener have joined the conference. Missing state 166 indicates that one or more participants are disconnected. Empty state 164 means that all participants are disconnected and emergency state 168 means that a listener has determined that the caller's needs require immediate intervention and has suspended the conference time monitor 178. The listener may access the IVR menu 142 and connect and bridge calls to outside services 182 such as a crisis hotline, or fire and rescue. FIG. 8 shows an active conference 158 in a normal state 162 where one participant disconnects from the conference prior to conference time out. In such cases the conference state function flags the conference as missing 166 and the call management module 148 may start an abandonment timer 180 that may add some time to the conference in order for the disconnected user to rejoin, or, in some implementations, the abandonment timer may shorten the remaining conference time. In some implementations, if a caller disconnects, the attendant listener may enter the IVR menu 144 and manually cancel the conference or start the abandonment timer 180. In some cases, a caller or listener may rejoin a conference after disconnection, in which case the conference will resume its normal state 162 and the abandonment timer is stopped 181. FIG. 9 is a diagram showing a conference that transitions from a normal state 162 to an emergency state when the listener determines that outside assistance is warranted; e.g., a caller credibly threatening to hurt themselves or others. Whether an emergency situation is considered resolved 183 depends on the situation. In most cases resolution means the caller is no longer threatening themselves and has successfully interacted with a crisis network, or perhaps a family member has intervened. Prospective listeners are required to complete training that covers various emergencies they may encounter in their roles. In some implementations, with the permission of the caller, whether as part of the original terms of agreement or in special cases where the caller may be notified during a caller-listener interaction, an experienced listener may participate in a conference in order to give feedback to a less experienced listener. In such cases, the listener-mentor will not intervene unless absolutely necessary and follow up with the less experienced listener after conference completion. The listener-mentor may make notes and provide suggestions on improving the other listener's interactions. Moving back to FIG. 9, when the call management module 148 determines the conference state to be empty 164, the abandonment timer is started 180 and the conference will time out 170.

Moving to FIGS. 10 and 11, similar to an active conference 158, the call state of participant connections are monitored by the call management module 148. A caller or listener can be joined 163, missing 167 or interacting 169 with the IVR menu 142, in which case, the participant is still in the conference, but temporarily isolated from other participant(s). A caller's status will be missing 167 if he or she simply disconnects, and a notification will be sent, usually via text message that informs the caller how to rejoin. Normally, the call timer will not be stopped if a caller disconnects. In the case of a listener disconnection, the call management module 148 will stop the conference timer and a notification will be sent, usually via text message that informs the listener how to rejoin. The specific key press operations shown in the diagrams to enter and exit the IVR are merely exemplary.

FIGS. 12, 13A and 13B are tables showing problems that may occur during a conference call and the various example steps that may be taken to resolve the problem. In some cases, a caller's steps to resolve will be different than a listener's. As shown in FIG. 13A, in some cases, a listener may opt to donate time to a specific caller or a caller may request that a friend or sponsor pay for session time for the caller. In various implementations, a listener, friend, partner or sponsor may generate a discount code or digital coupon that is available to the caller through their dashboard or, the code, discount link or coupon may be emailed or messaged to the caller.

Figure 14:
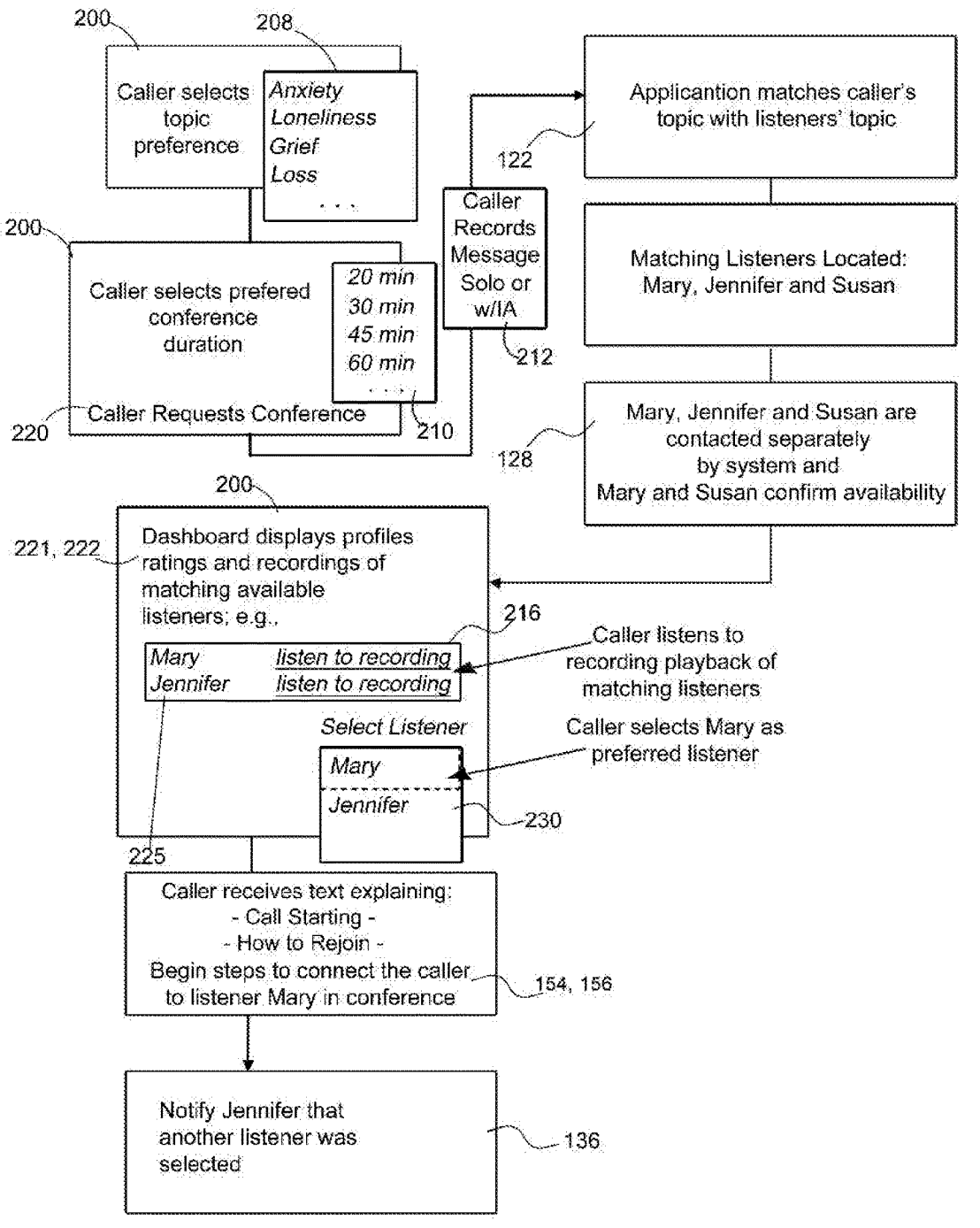
FIG. 14 is a diagram depicting a caller's request for a listener conference, and a caller review process and selection of an available listener.

FIG. 14 is a diagram depicting a caller's request for a listener conference, a caller review process and selection of an available listener. The diagram shown assumes that the caller has already registered and submitted a recording 212 which may include an interaction with an intelligent assistant where the caller can be listened to describing his or her difficulty. In some implementations, the interaction with the intelligent assistant may be optional. In some implementations, callers request a conference through their dashboard UI 200 via request conference control 214. As part of the request, the caller is required to select a conference topic from a topics list 208 and a conference duration 210. Once the request is received, the application matches prospective listeners to the caller's preferences and contacts each of the matched listeners with information regarding the request such as the caller's recording and general profile information. Once the matched listeners review the caller's request, they may accept or decline. Request accepting listeners 504 are reflected in the caller dashboard acceptances list 225 which includes a recording playback control 216 enabling the caller to pre-screen recordings made by the accepting listeners. Selecting a listener from the acceptances list 230 initiates the conference.

FIG. 15A is a generalized depiction of a voice notification and accessing the IVR menu 142. While in the IVR menu mode, a caller's or listener's actions are isolated, IVR global functions permit the pausing or interruption of conferences to inform all participants simultaneously of conference time status, and provide instructions on extending time or other notifications that may be necessary for various implementations. In some implementations (see FIG. 15B), when time is low, the Caller may be presented a screen that allow Callers to purchase additional minutes in bundles in real time.

Figure 16:
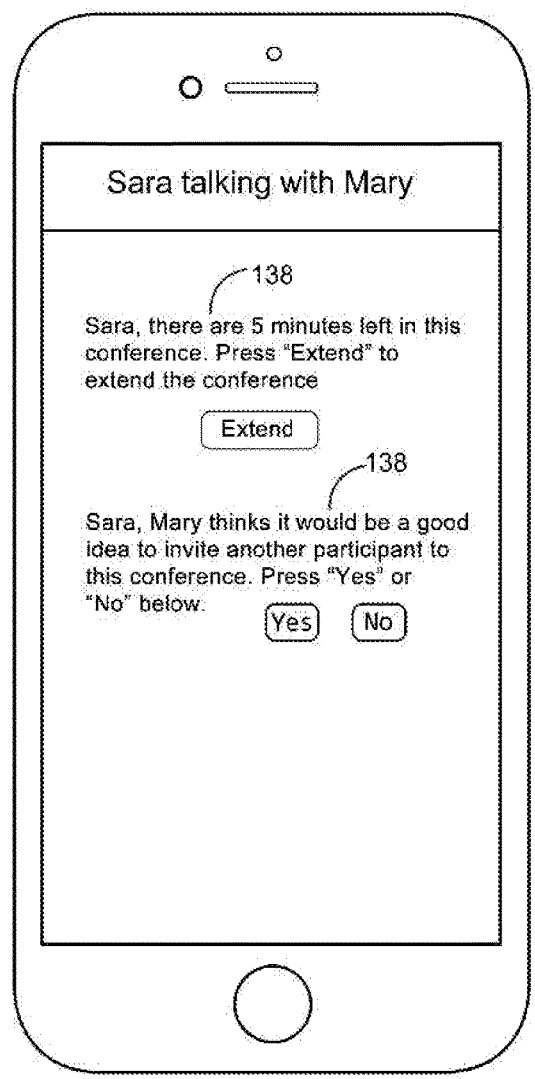
FIG. 16 is a generalized depiction of a MMS notification with one or more response options that may include pressing a link or a button.

Moving to FIG. 16, in some implementations, MMS with selectable controls 138 may provide another modality for intra-conference communication whereby a caller may perform operations such as requesting an extension of time or agreeing to the admittance of a third party participant as suggested by a listener. The request to extend time may raise the screen shown in FIG. 15B, or in some implementations, time may be extended in pre-set increments.

Figure 17:
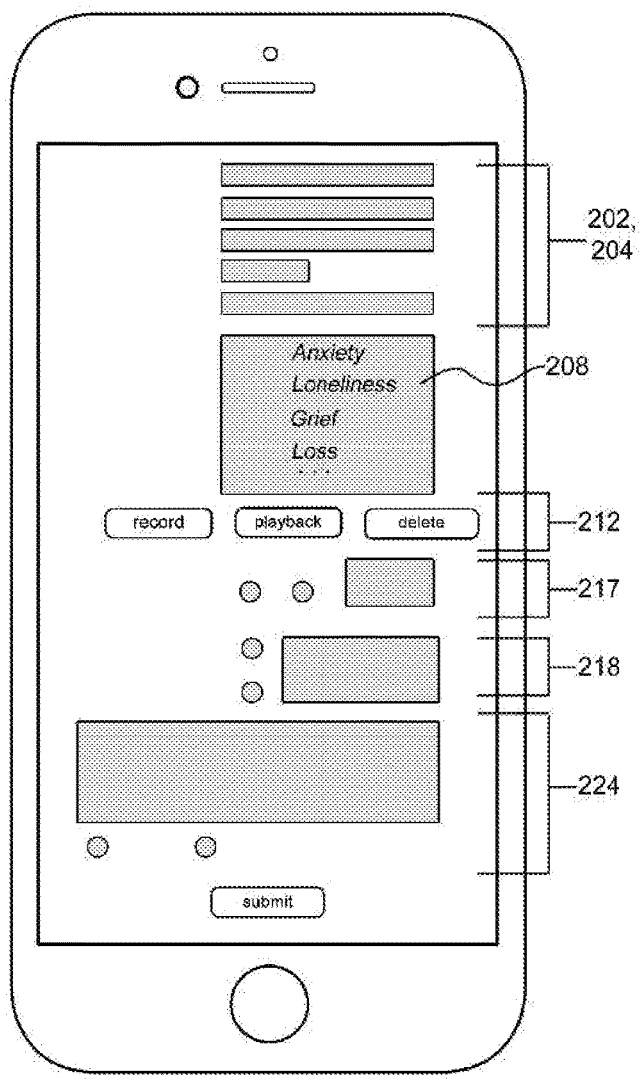
FIGS. 17 and 18 are generalized depictions of an example Caller Dashboard UI.
Figure 18:
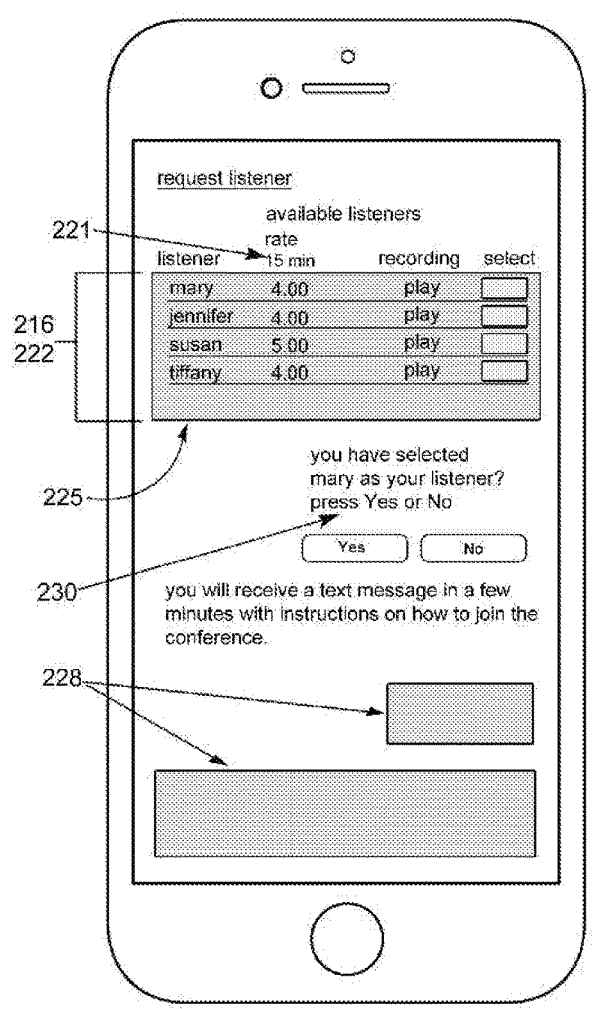

FIG. 17 is a generalized depiction of an example Caller Dashboard UI in registration mode, including control groups such as caller identification controls 202, caller contact controls 204 caller topics list 208, caller audio recording control(s) 212 that permit a caller to record, playback, delete or save recordings, age and gender preference controls 217, religious preference controls 218, a terms and conditions control 224. FIG. 18 shows a Caller Dashboard UI in listener selection mode, including an acceptances list 225, listener recordings playback control 216, fee listing 221, listener ratings 222, a launch conference control 230, and caller feedback controls 232 that enable the caller to rate his or her conference experience or submit a more lengthy comment. In some implementations, when the caller selects the record button which may be labeled "Discuss" an intelligent assistant may offer to provide a pre-screening sounding board if the Caller wishes. In some implementations, a control may be labeled "Discuss with an intelligent assistant first." Persons having skill in the art will appreciate that various discussion selection options may be provided to the Caller without departing from the spirit and scope of the invention.

Figure 19:
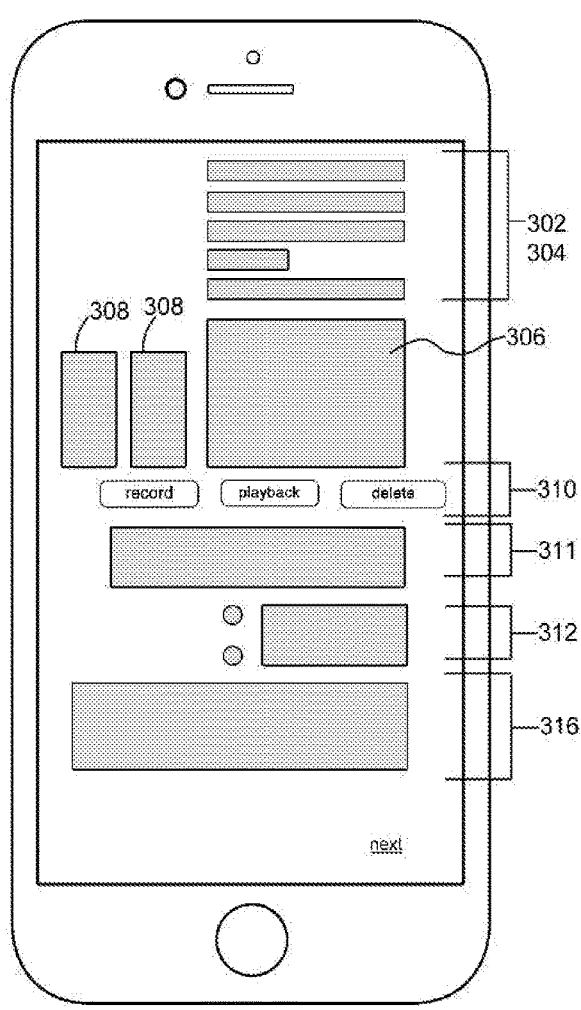
FIGS. 19, 20 are generalized depictions of an example Listener Dashboard UI.
Figure 20:
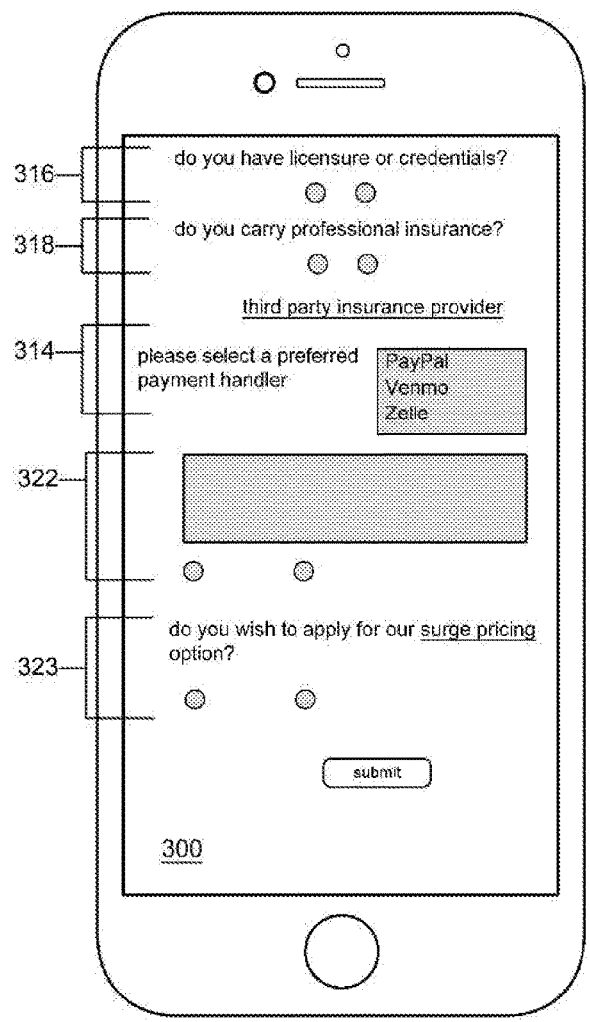

FIGS. 19 and 20 show a listener dashboard UI 300 that includes listener identification controls 302 whereby a listener creates a user name, inputs his or her legal name, date of birth, drivers license information and gender, contact controls 304 for inputting address and email, a listener topics listing 306, dates and times available controls 308, a listener recording control 310 whereby a listener may record a short message describing his or her experience(s), a religious preference control 312 whereby listeners can input religious preferences (if any) and controls 311 for inputting free text descriptions of relevant experience. While conceivably, both licensed and unlicensed persons can be listeners, those who are licensed or credentialed will require professional insurance. Accordingly, implementations described herein may include or exclude licensed professionals without departing from the present invention with the understanding that implementations that allow licensed professionals would be required to meet HIPAA compliance standards. Dashboard 300 includes controls 316 that allow listeners to describe their credentialing or licensure (if any), an insurance confirmation control 318 and one or more link(s) to third party professional practice insurance providers to assist with insurance coverage. In some implementations, listeners may be prompted to upload copies of degrees, certifications or licenses. Listeners may be provided a list of common payment processors 314 from which to select, and presented terms and conditions 322 that must be agreed to in order to participate in listening opportunities. In addition, listeners may be given the chance to apply for surge pricing opportunities 323, details of which are described later in this disclosure.

Figure 21:
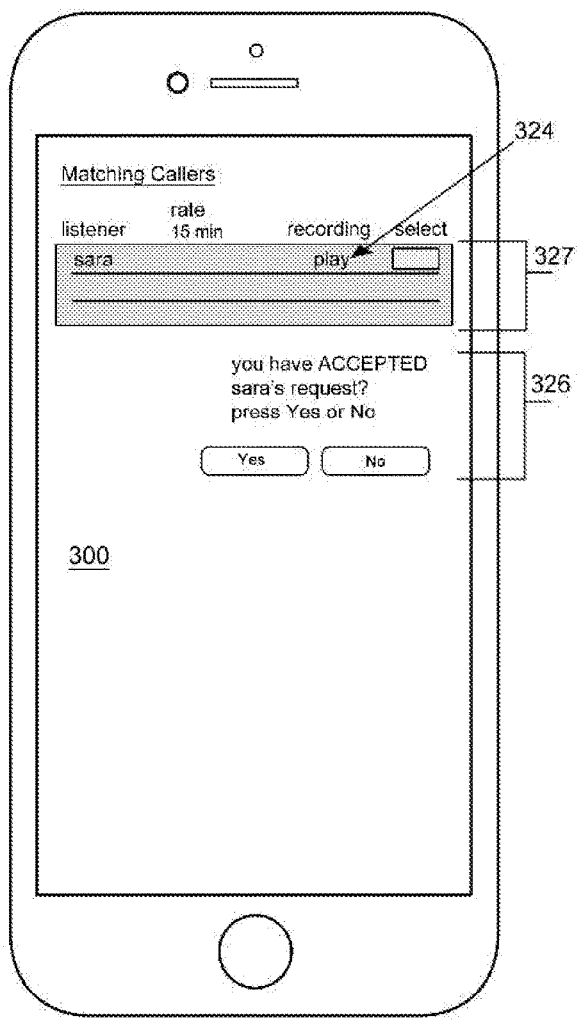
FIG. 21 is a generalized depiction of an example Listener Dashboard UI in a Caller selection mode.

FIG. 21 shows a listener screen whereby in some implementations, a matched listener may pre-screen a requesting caller by listening to caller provided recordings via playback control (324), and optionally accept or decline (326) a caller's request.

Figure 22A:
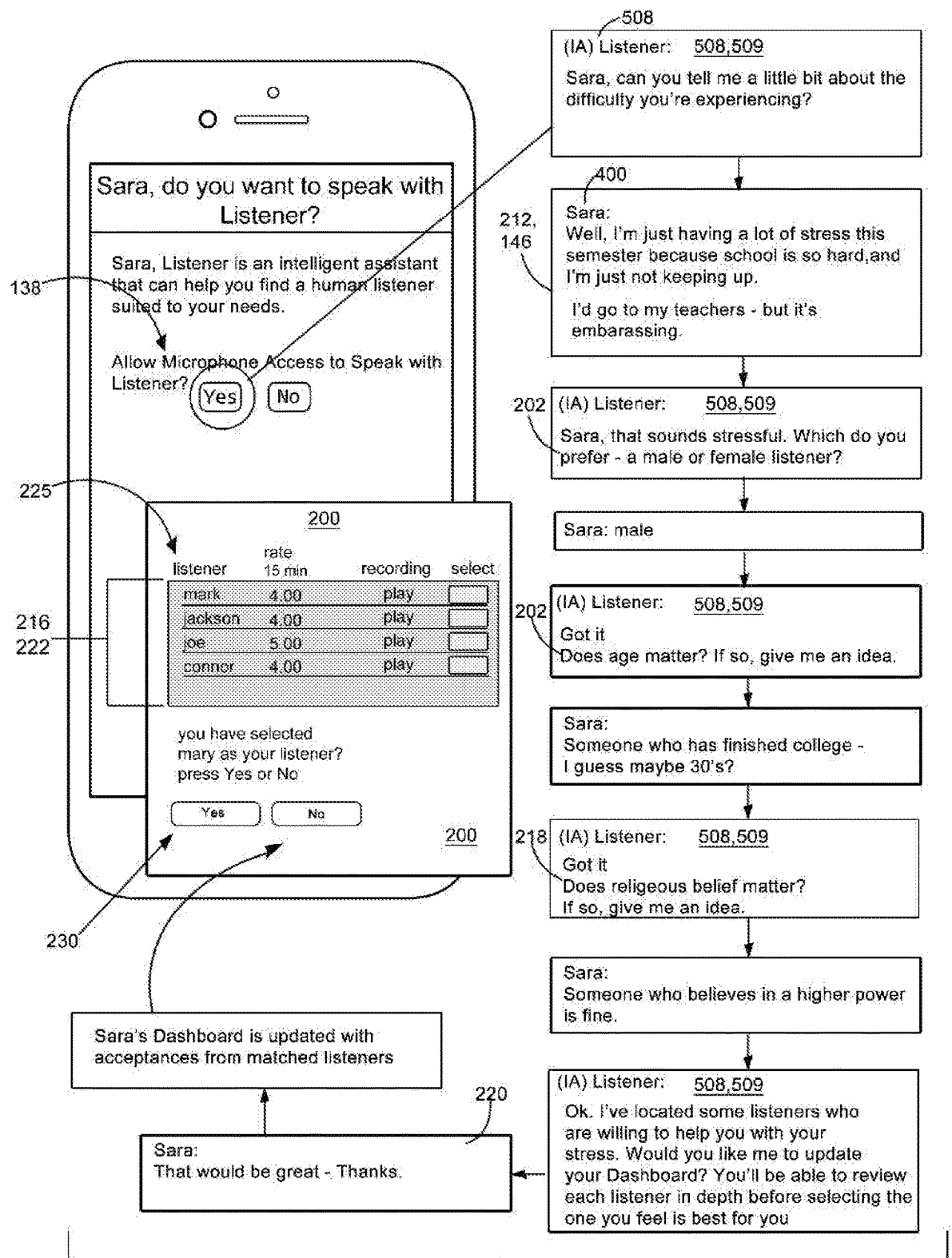
FIG. 22A is an example implementation of caller pre-screening that includes an intelligent assistant.
Figure 22B:
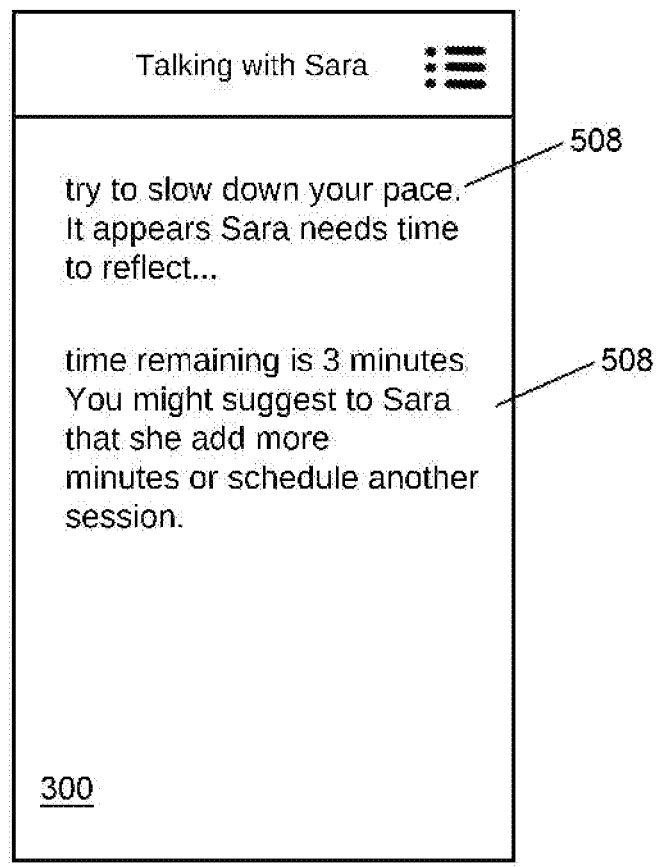
FIG. 22B is an example implementation of intelligent assistance to monitor and mentor a caller-listener interaction.

FIGS. 22A and 22B are diagrams of example implementations that include a client application and an intelligent assistant (IA) (508) that can be accessed through the application interface. FIG. 22A depicts a pre-screening process where a caller describes his or her problem to an intelligent assistant who then at the back end parses the interaction in order to feed parameters such as caller preferences regarding potential listeners and specific problem related information to the matching engine of the application. The intelligent assistant may a leverage a third party service (e.g., Intelligent Voice®, Alexa®, Conversica®, Google Assistant®, Amazon Lex®) which can interpret a caller's description of his or her difficulty, categorize the difficulty and finally initiate the search for matching listeners. In some implementations, matched listeners may listen to a recording of the interaction between the caller and the intelligent assistant as a pre-screening step to decide whether to accept or decline the listening opportunity. In some implementations, a caller, prior to interacting with the intelligent assistant, may have submitted certain preferences to the application which are then used to isolate prospective listeners and the prospective listeners may listen to the caller-IA interaction in real time. Step-wise narrowing of a group of prospective listeners may help expedite the matching process. Compared with a solo recording, the interaction between the intelligent assistant and the caller is a back and forth dialog, instead of a one way description of a caller's difficulty. Accordingly, interaction with the intelligent assistant may be a more instructive record of a caller's situation whereby a prospective listener may base highly informed listening decisions. For example, the interaction of the intelligent assistant with a caller will share some qualities with an interview; a feature that a single participant recording lacks. Hence, issues may be raised that a caller might otherwise overlook in a monologue. In the particular example shown, a caller with username Sara has activated the intelligent assistant which proceeds to ask what Sara feels like discussing. When Sara explains that school is stressful, the intelligent assistant may ask Sara if she has spoken to a school counselor, if she has family members she feels comfortable speaking with about the issue and many other questions that would yield a highly descriptive profile. Interactions between the intelligent assistant and a caller may be recorded and available to human listeners as a pre-screening tool to better match not only a listener's experience with a particular topic (stress), but also to match potential conference participants' temperament. Like other implementations described herein, the decision to engage in a therapeutic exchange is bilateral as both the caller and listener take part in the pre-screening process. Once the intelligent assistant has obtained Sara's preferences, it offers Sara the opportunity to speak with some matched listeners. Hence pre-screening by the IA becomes part of a listener matching process. In the example shown, Sara's verbal agreement is analogous to a form submitted conference request 220. Once application 101 processes the request, pre-matched listeners are provided the opportunity to review the interaction between Sara and the intelligent assistant and decide whether to participate. The application updates Sara's dashboard 200 with the list of accepting listeners 225. Sara may now review the profiles that include a listener recording playback controls 216, listener rates 221 and make a listener selection 230. In other implementations, similar to the listener mentor scenario, the intelligent assistant 508 may 'listen' in on a caller-listener interaction to assess trends in the communication that include but are not limited to certain words or phrases, frequent use of certain words or phrases, quantity and duration of pauses for both a listener or a caller and any other metric in order to provide real-time feedback contemporaneous with the interaction, whereby the listener is given objective feedback and the tools with which to notified of certain metrics in order that the listener can improve the caller experience and model his communication skills. Ramifications of the real time feedback process are better trained listeners and the data from interactions that will shed light on verbal communication and forms an iterative process for improving caller-listener matching algorithms.

Figure 23:
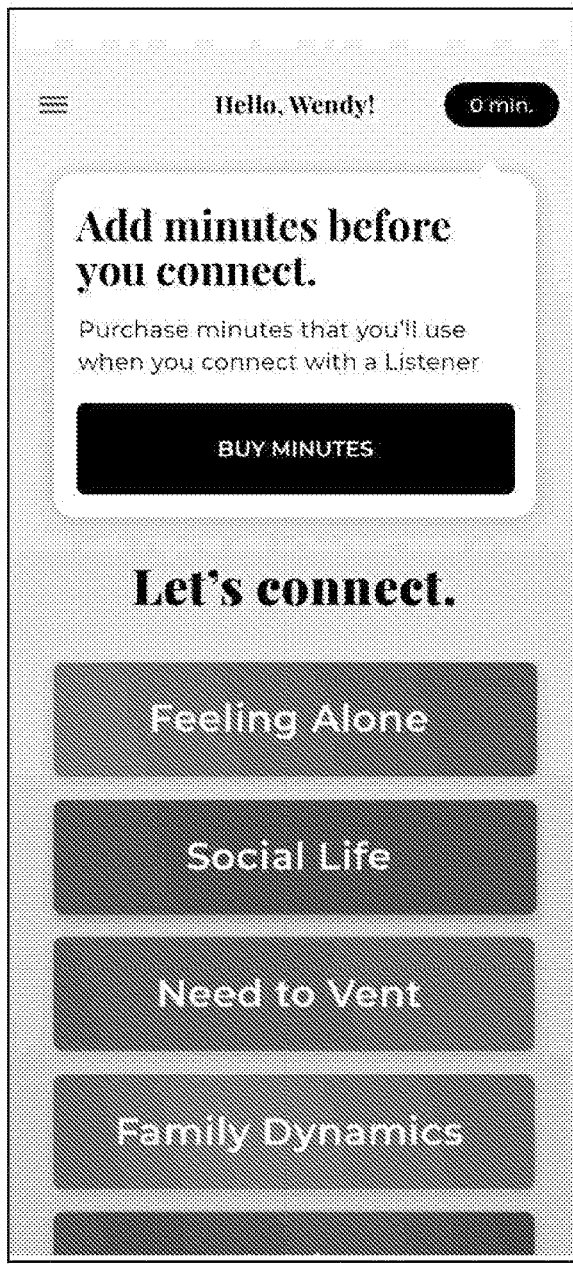
FIGS. 23-51 are various example implementations of Caller and Listener interfaces.
Figure 24:
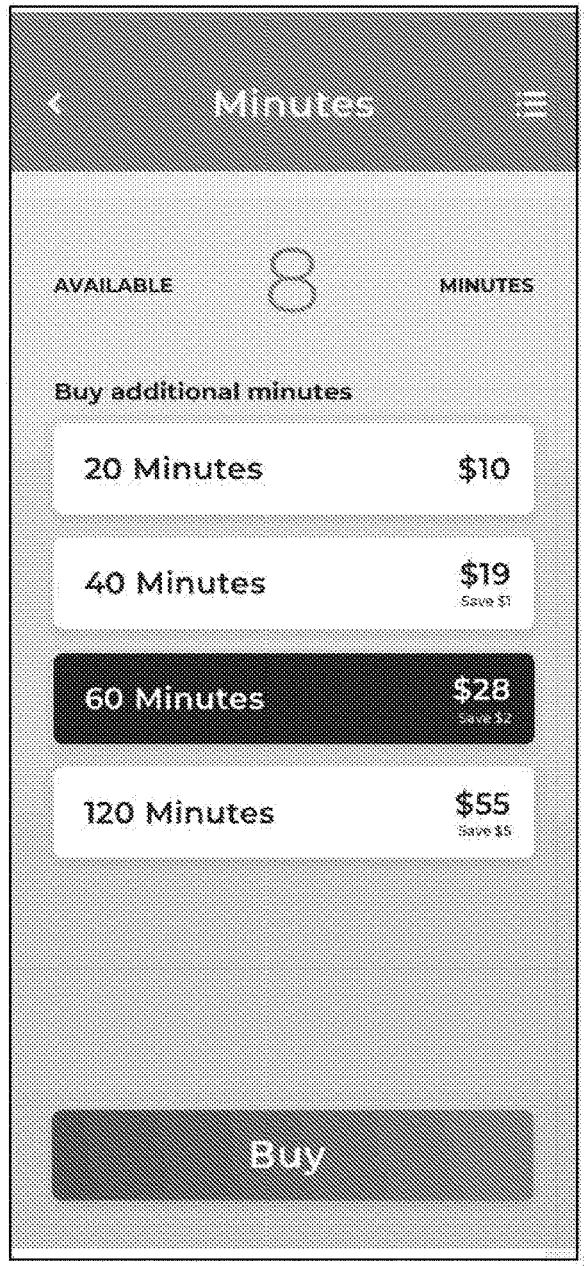

FIGS. 23-51 are additional example implementations of user interfaces. FIG. 23 is an example caller dashboard with an interface that permits adding minutes to a minutes bank prior to the initiation of a caller-listener conference. FIG. 24 shows a screen whereby callers can purchase minutes in bundles.

Figure 25:
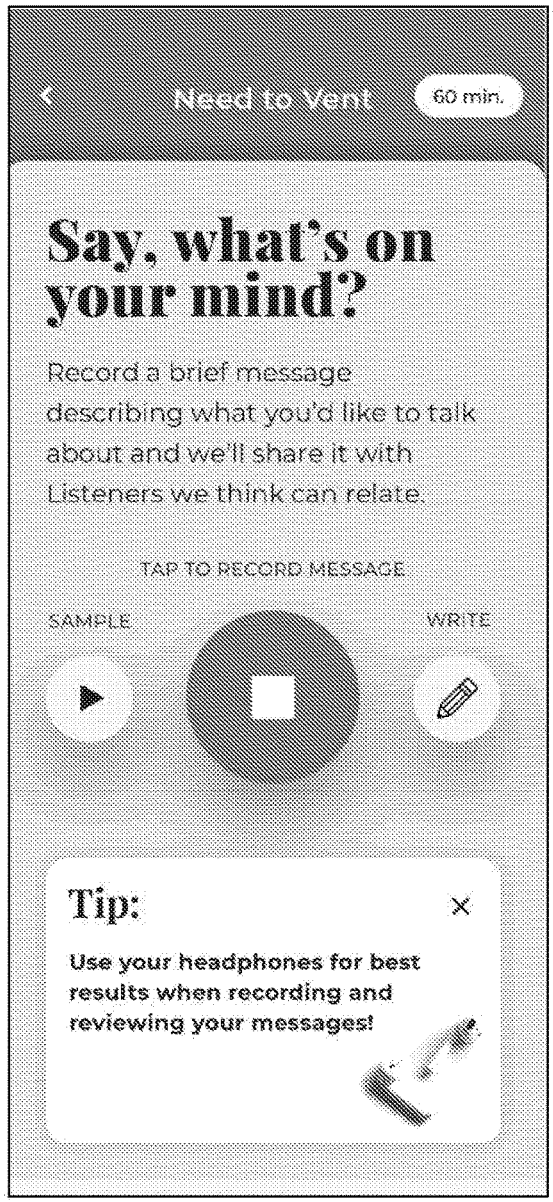
Figure 26:
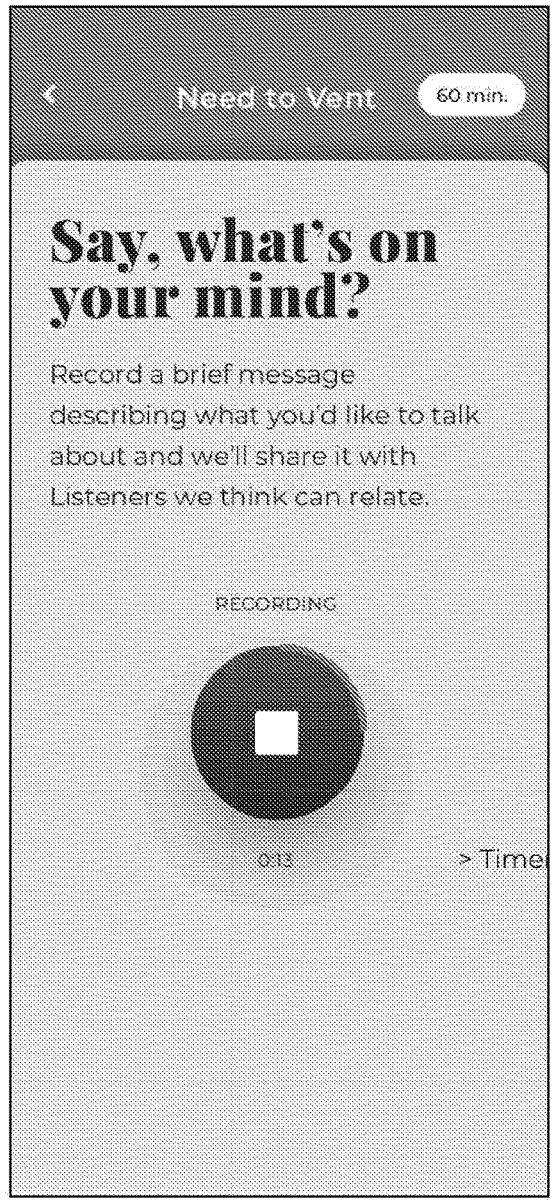
Figure 27:
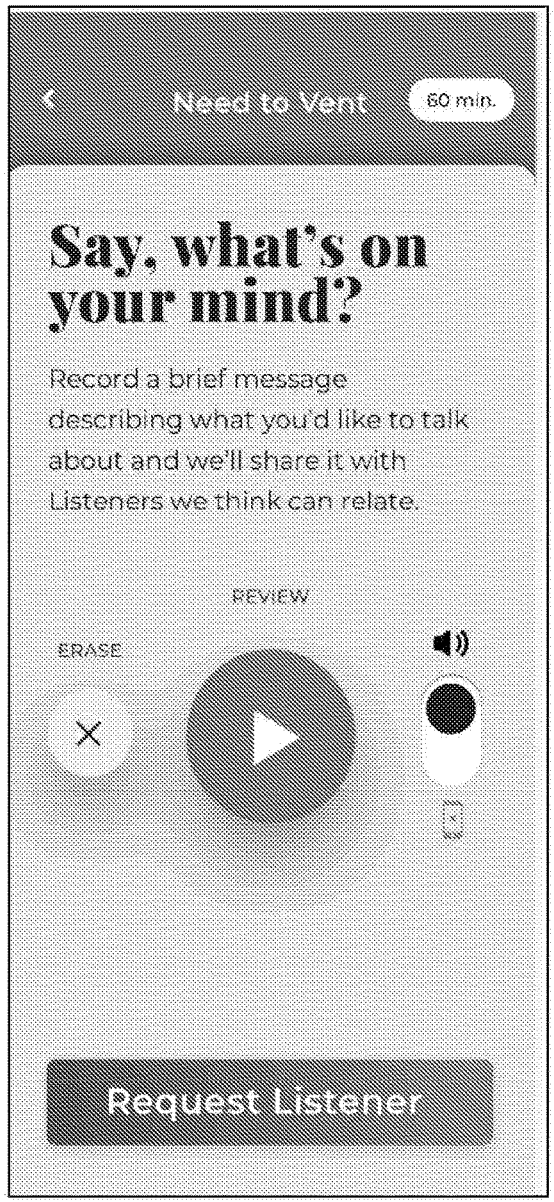
Figure 28:
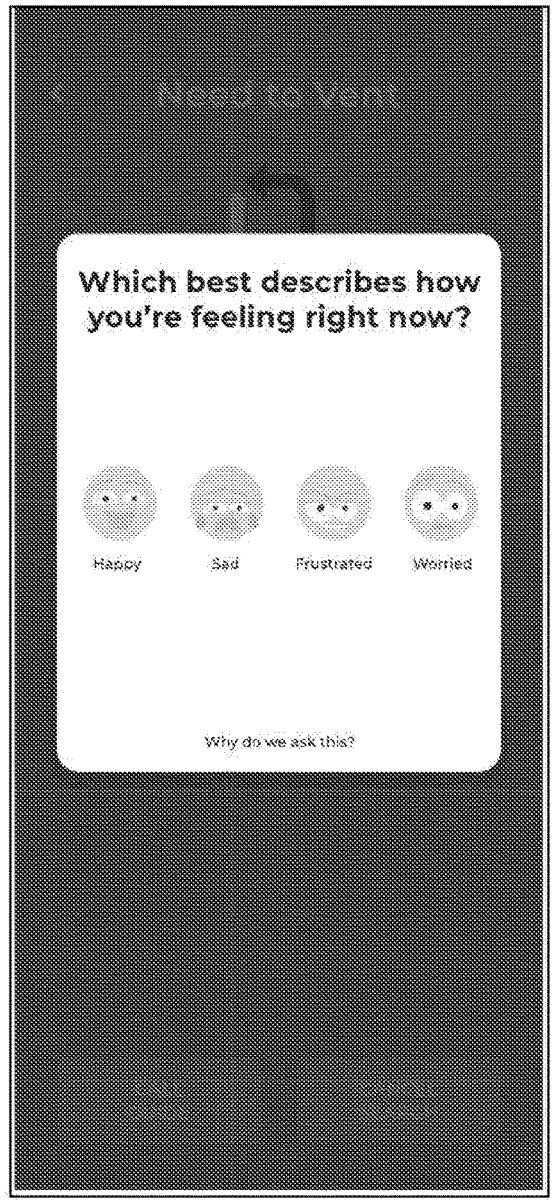
Figure 29:
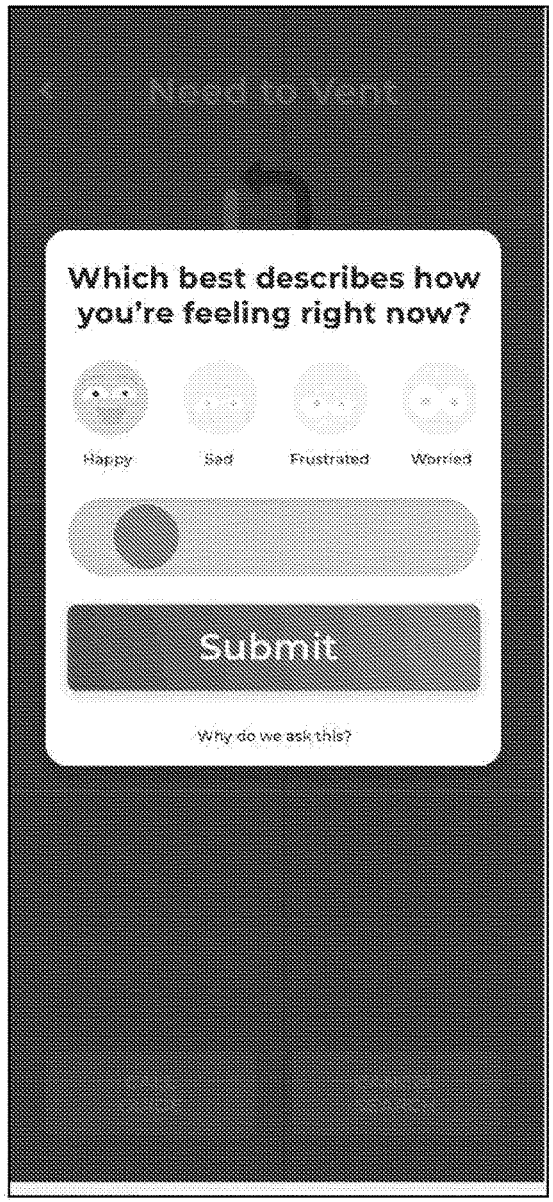

FIGS. 25 and 26 shows example screens with controls that allow the caller to record a message describing his or her difficulty. FIG. 27 shows a screen that includes controls that allow a caller to review, erase or record another message. FIG. shows a screen with a control that prompts a caller to evaluate his or her feelings. It should be understood from other examples described herein that the recording control may permit a caller to access an intelligent assistant as part of a pre-screening process. Alternately, an option to interact with an intelligent assistant may be presented in the caller UI after the caller has submitted a recording.

Figure 30:
Figure 31:
Figure 32:
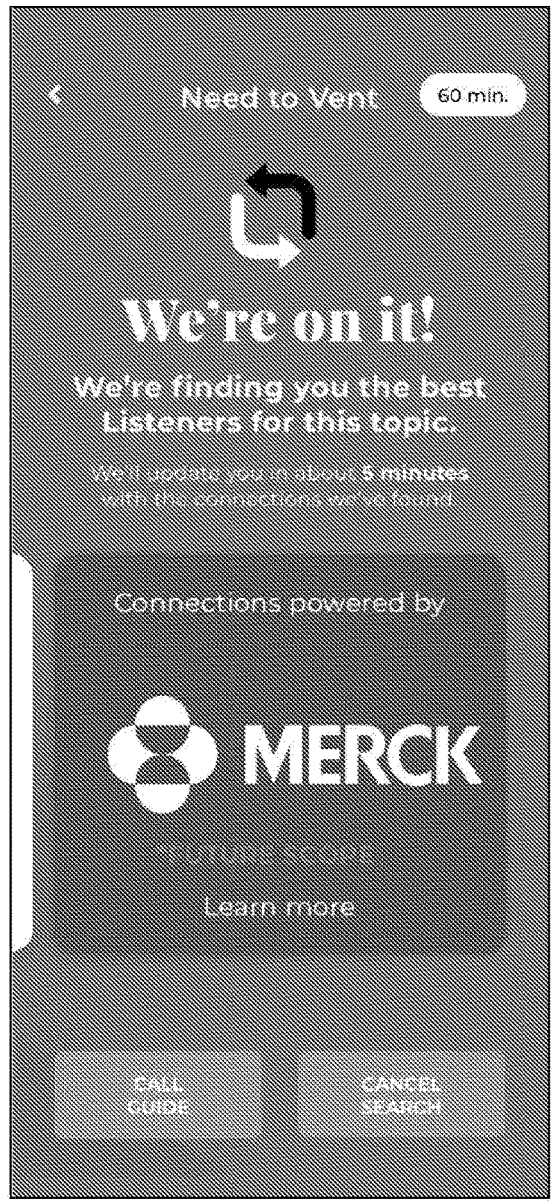

FIGS. 30-32 show example screens where the matching engine of the application is attempting to match the caller preferences and attributes to one or more matched listeners.

Figure 33:
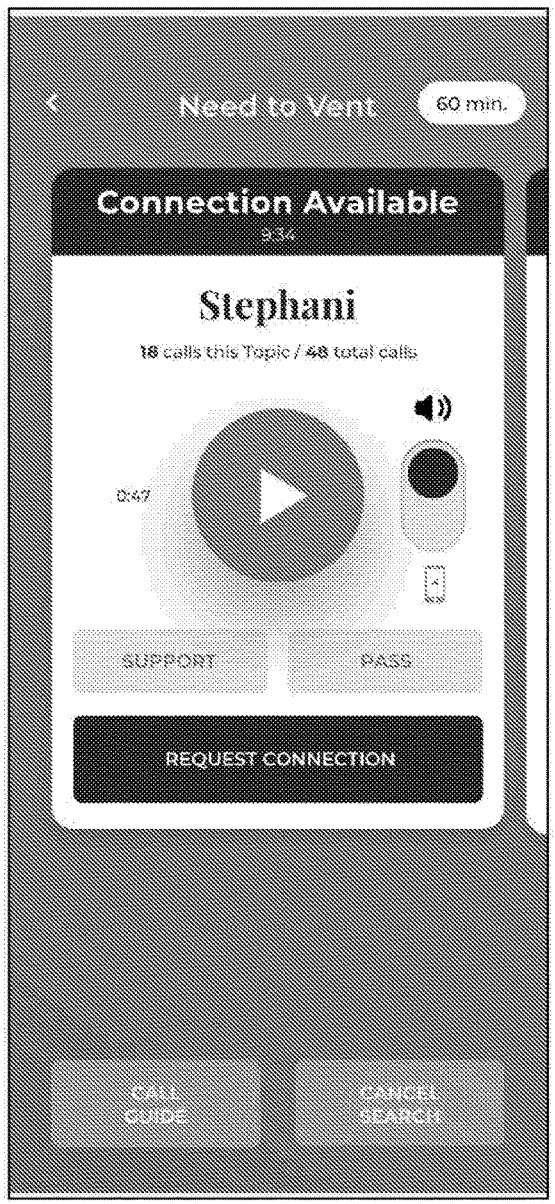
Figure 34:
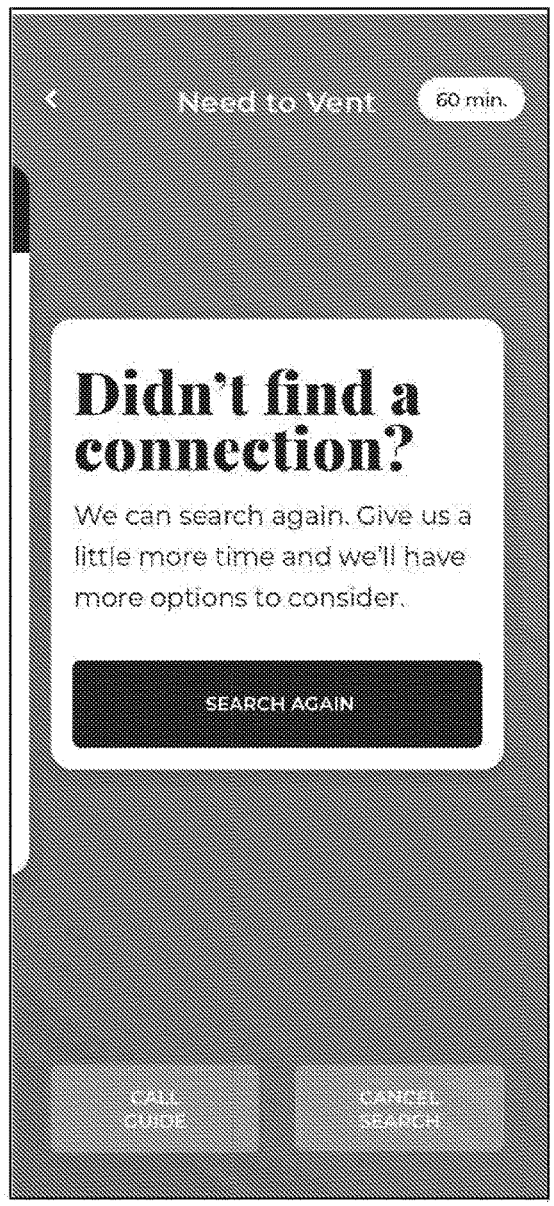
Figure 35:
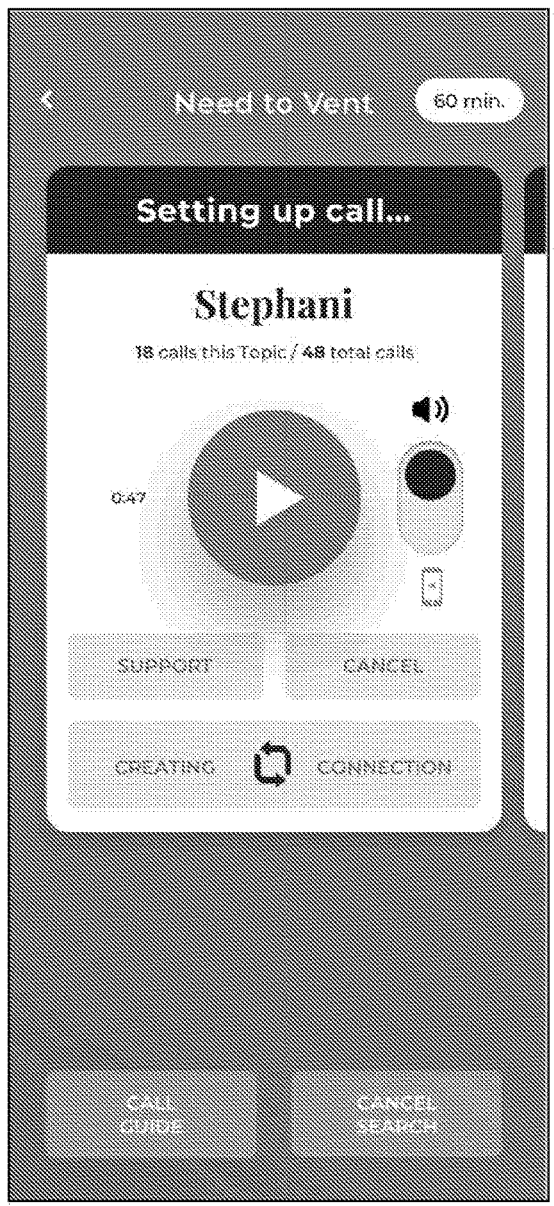
Figure 36:

FIG. 33 is an example screen presenting a matched listener to the caller to accept or pass over. In some cases, the caller may opt to pass over the system match and is presented with an option to search again (see FIG. 34). In cases where a caller opts to accept the system matched listener, the application may present screens similar to that shown in FIGS. 35 and 36 that may also include instructions in case the call is disconnected.

Figure 37:
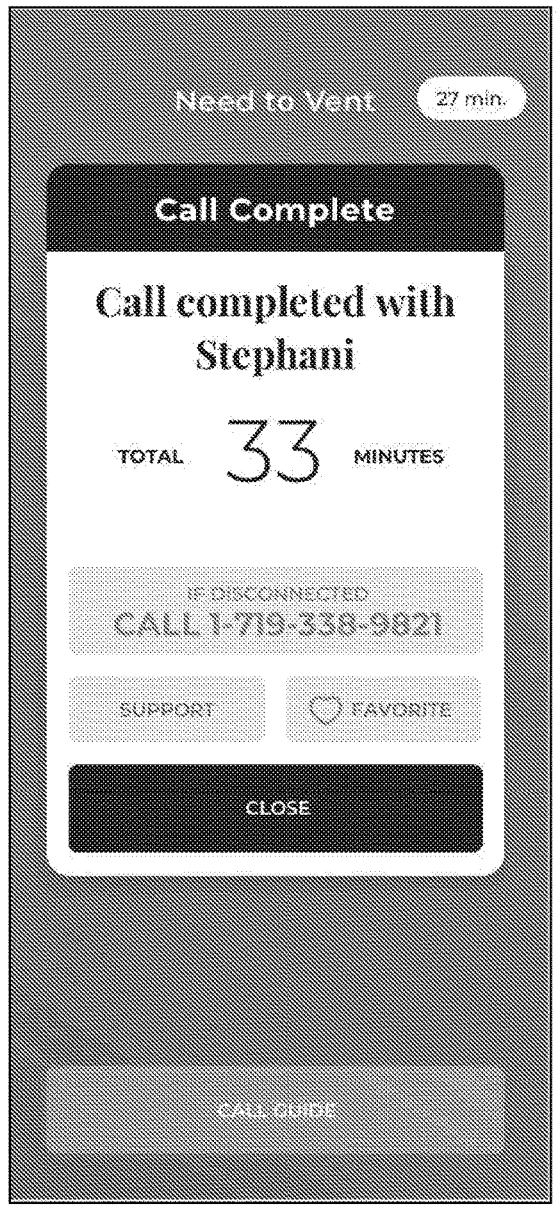
Figure 38:
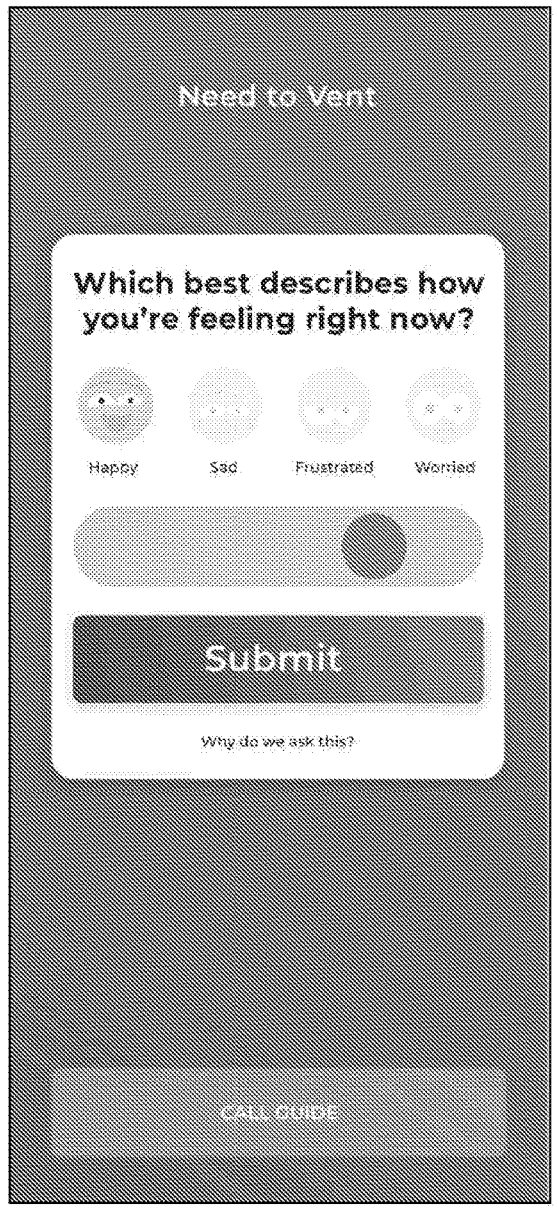
Figure 39:
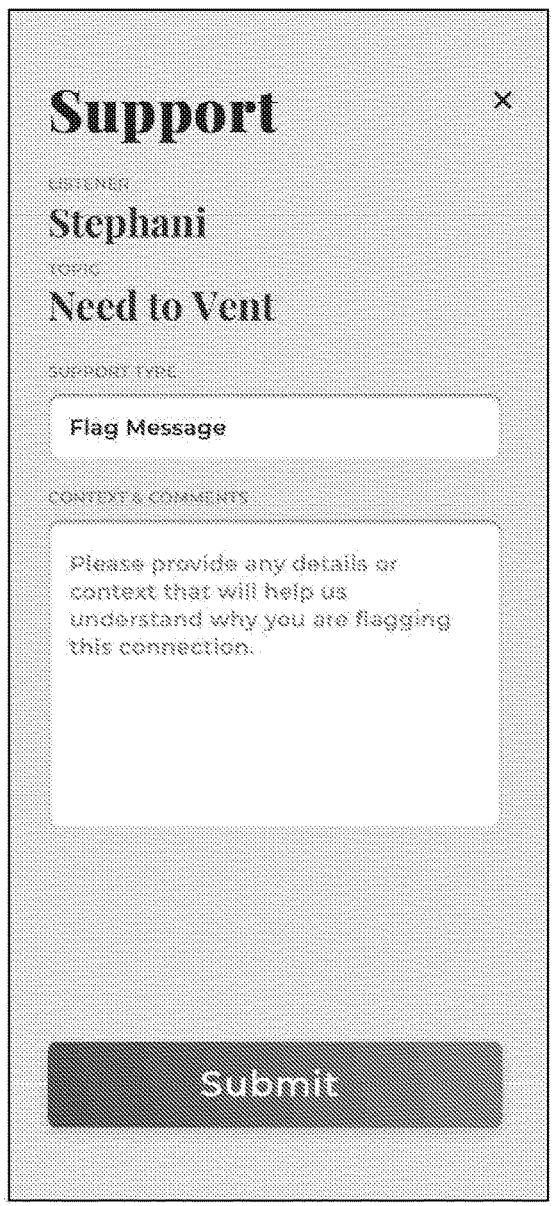

FIG. 37 shows an example screen presented to the caller upon completion of a caller-listener conference. FIG. 38 shows an example screen that asks the caller to assess his or her feeling after call completion. FIG. 39 shows an example screen with controls enabling the caller to flag a connection/listener and provide feedback whether negative or positive.

Figure 40:
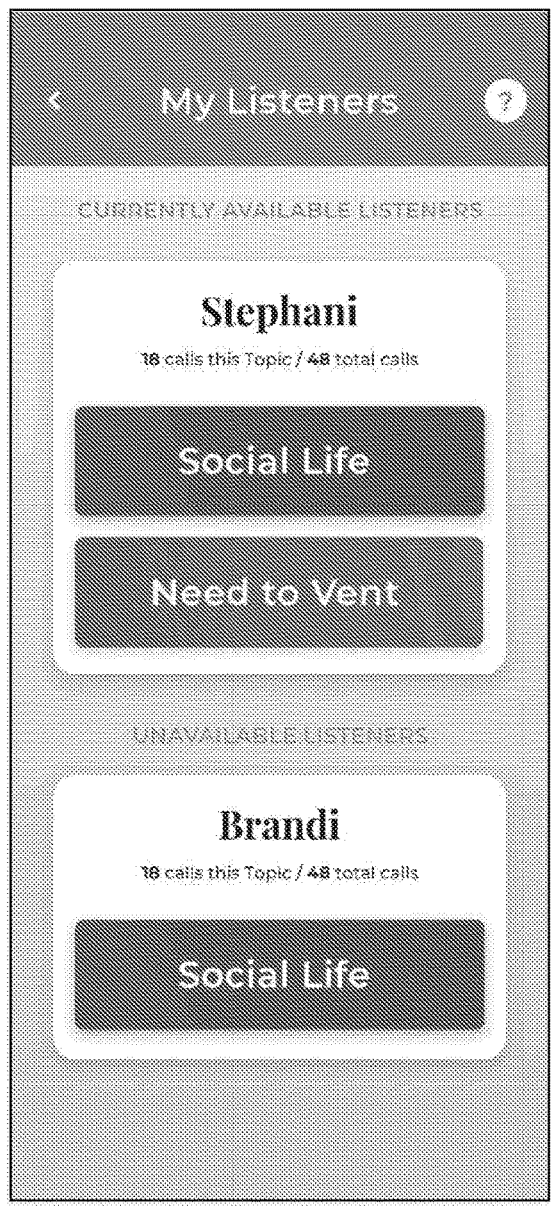
Figure 41:
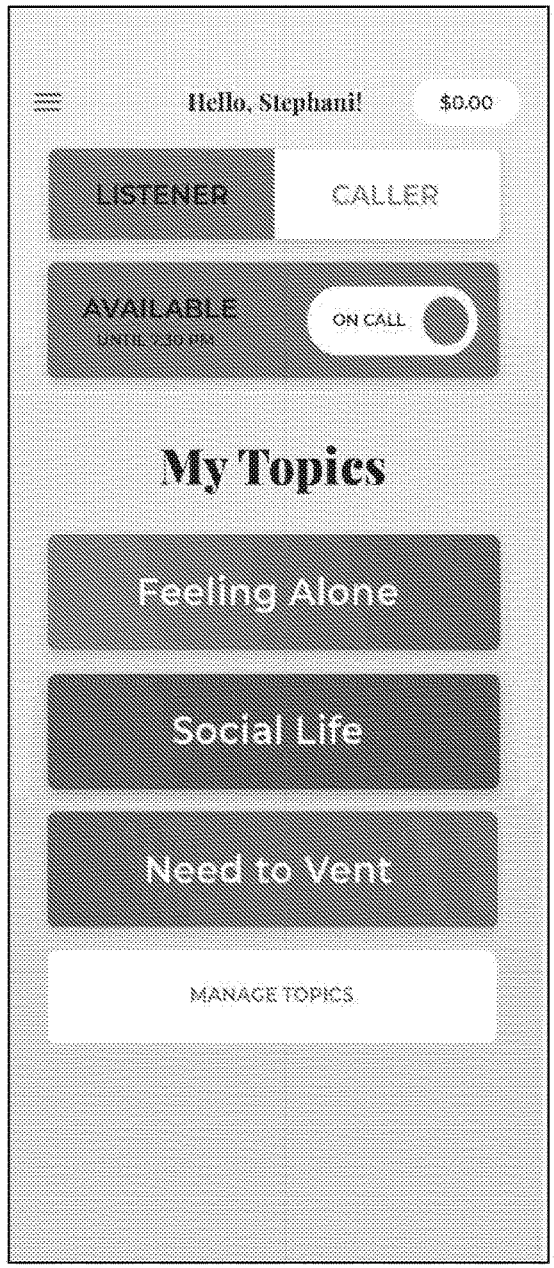
Figure 42:
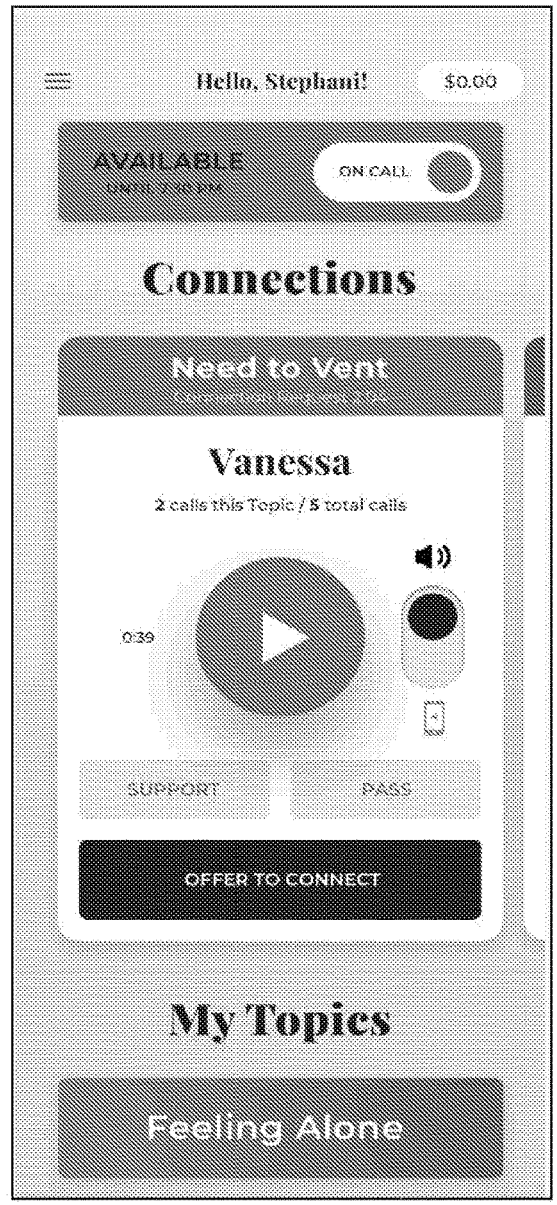
Figure 43:
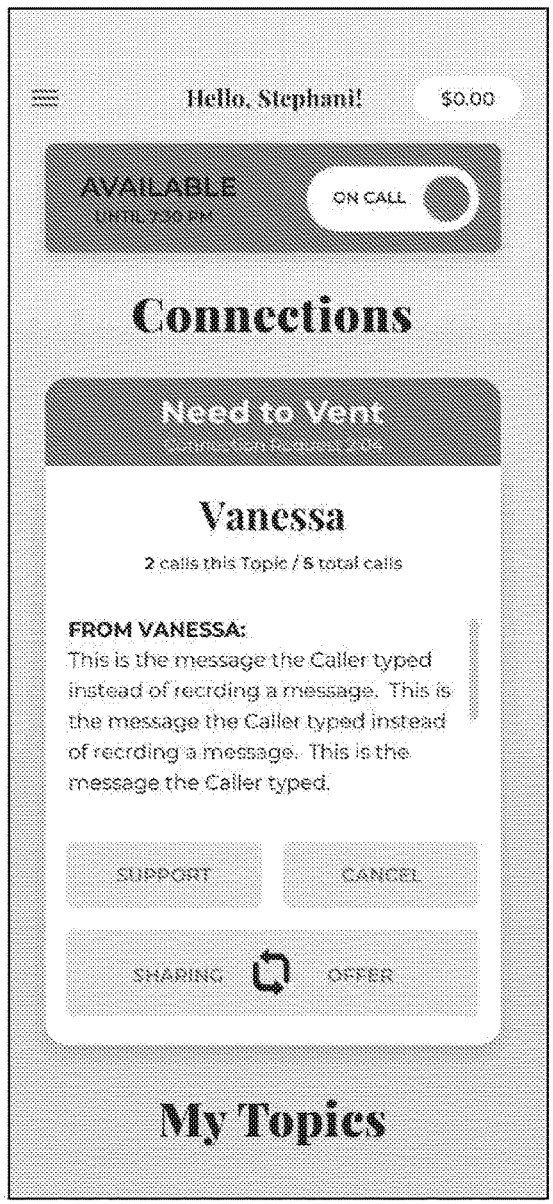
Figure 44:
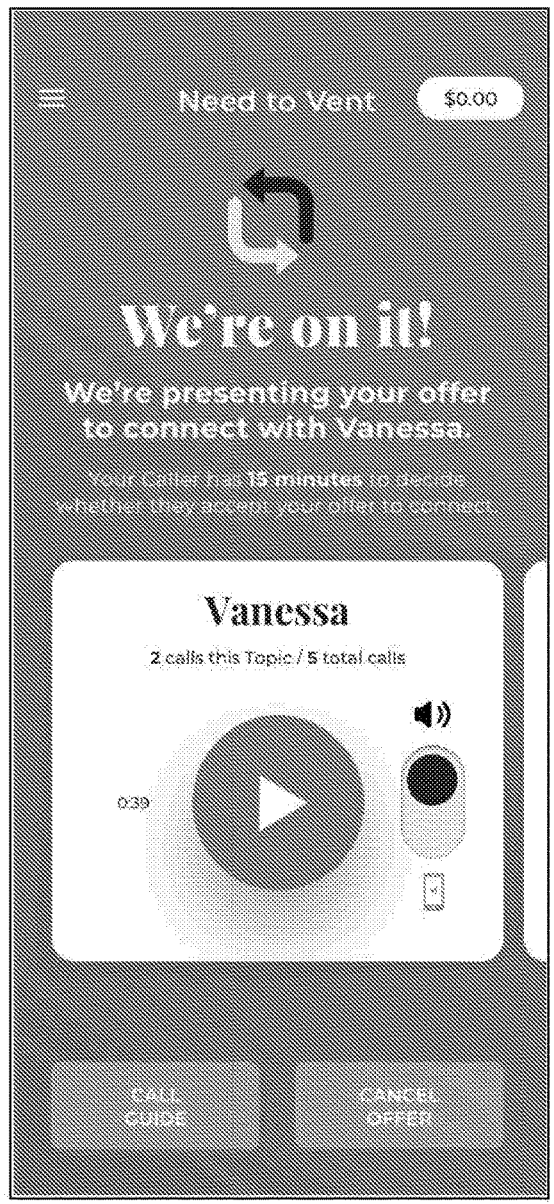
Figure 45:

FIG. 40 shows an example screen that includes listeners with whom the caller has previously interacted with the associated conference topic and controls that indicate the availability of the listeners.

FIGS. 41-45 show example listener screens enabling a listener, in this case "Stepani," to manage her time settings, view matched callers, review caller recordings or written messages and decide whether to engage with the caller.

Figure 46:
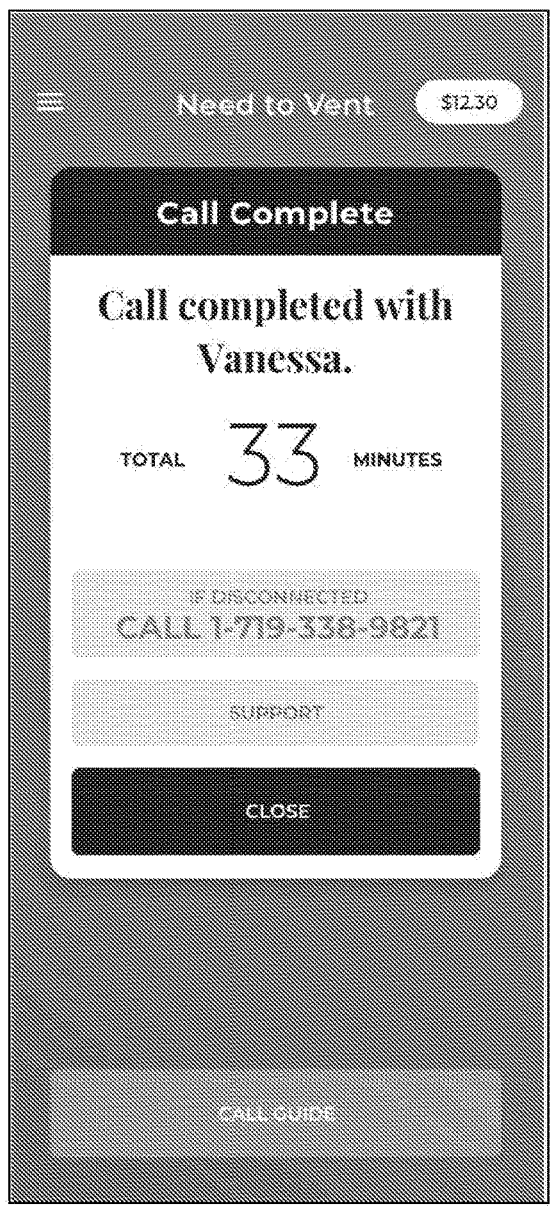

FIG. 46 shows an example listener screen presented to the listener upon completion of a caller-listener conference.

Figure 47:
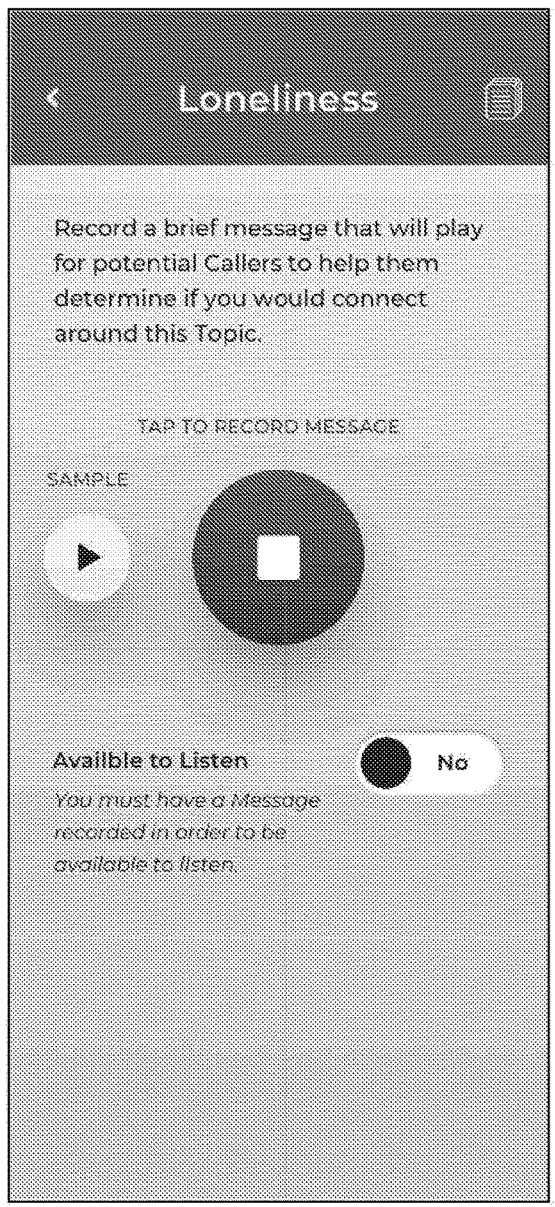
Figure 48:
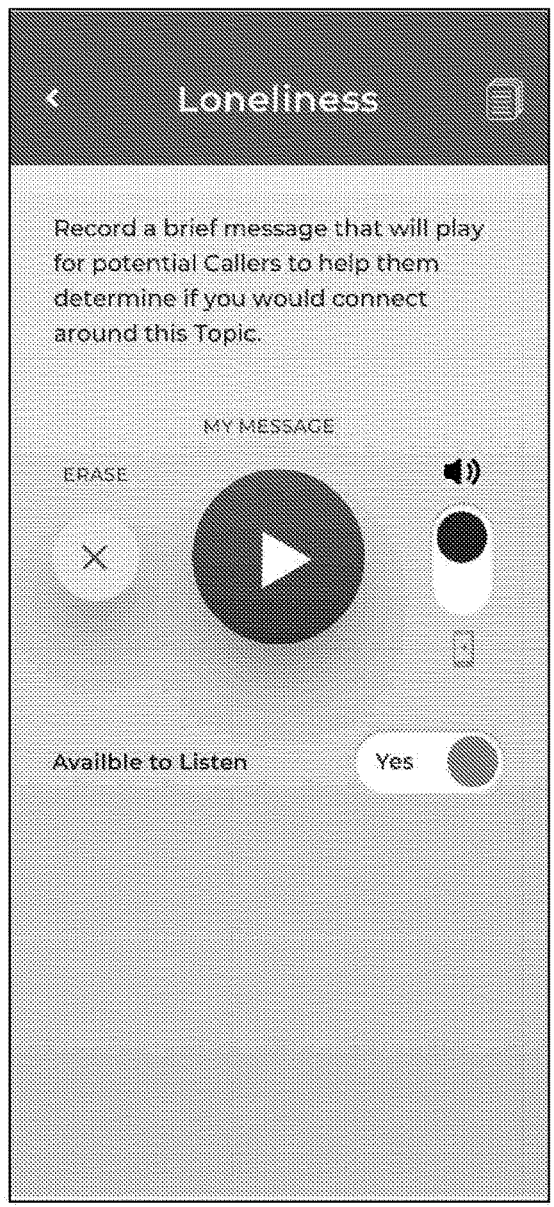

FIGS. 47 and 48 show example listener screens with controls that allow a listener to record a topic specific message that can be played back by system matched callers.

Figure 49:
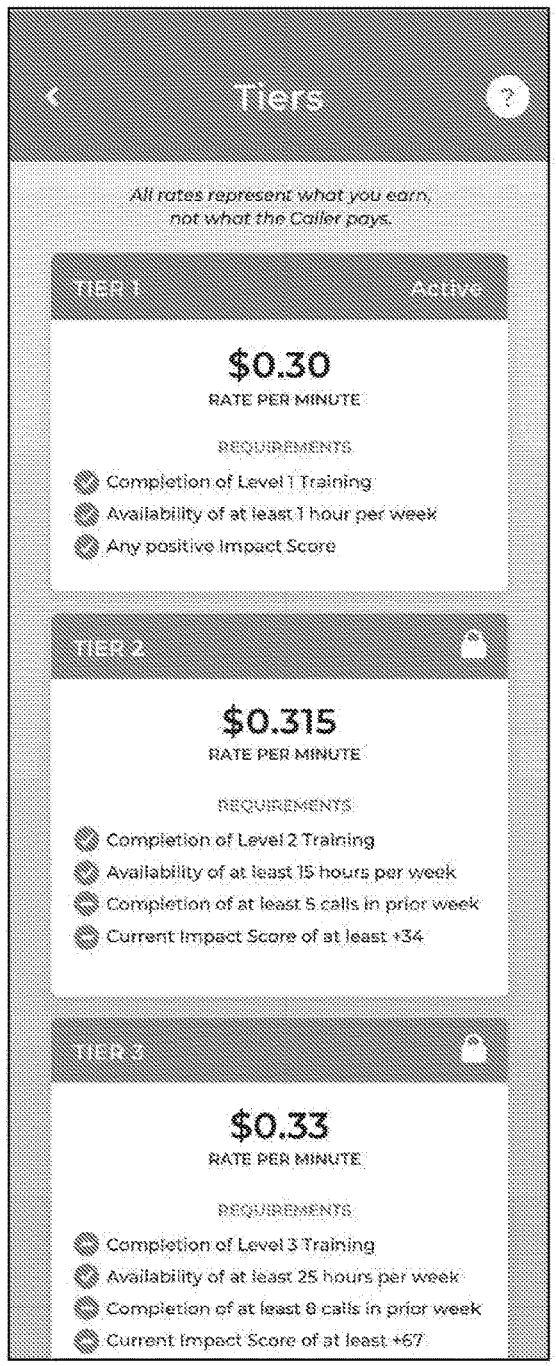
Figure 50:
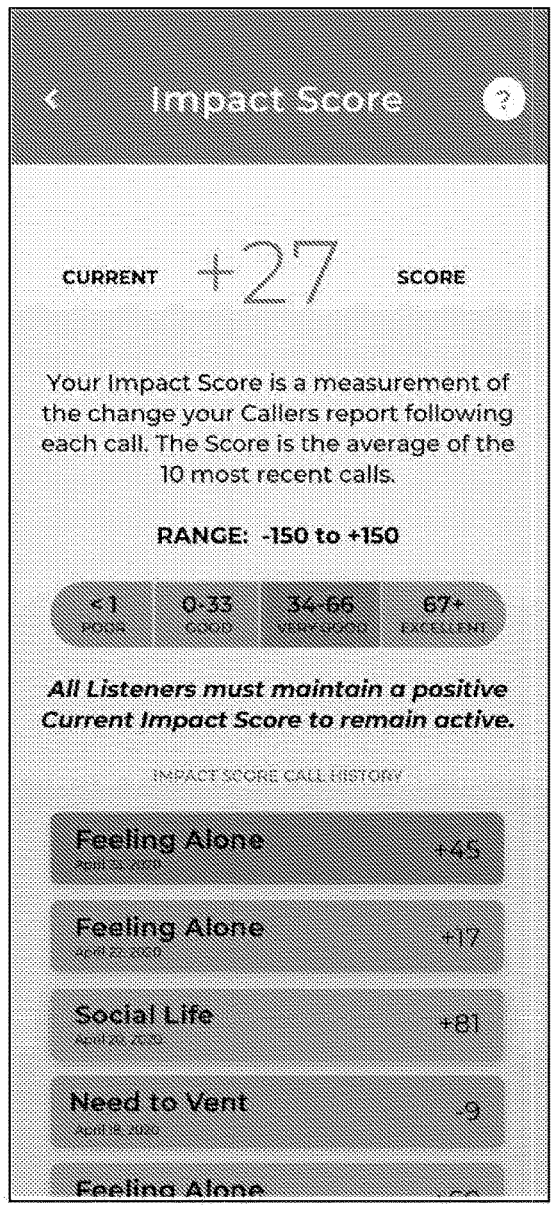

FIGS. 49 and 50 are example screens for listeners that show what a listener can earn depending on the amount of training and his or her impact score. Impact scores for listeners may be derived partly from metrics such as the mood assessment feedback which may be a delta between inputs prior to and upon completion (see FIGS. 29 and 38) of a conference.

Figure 51:
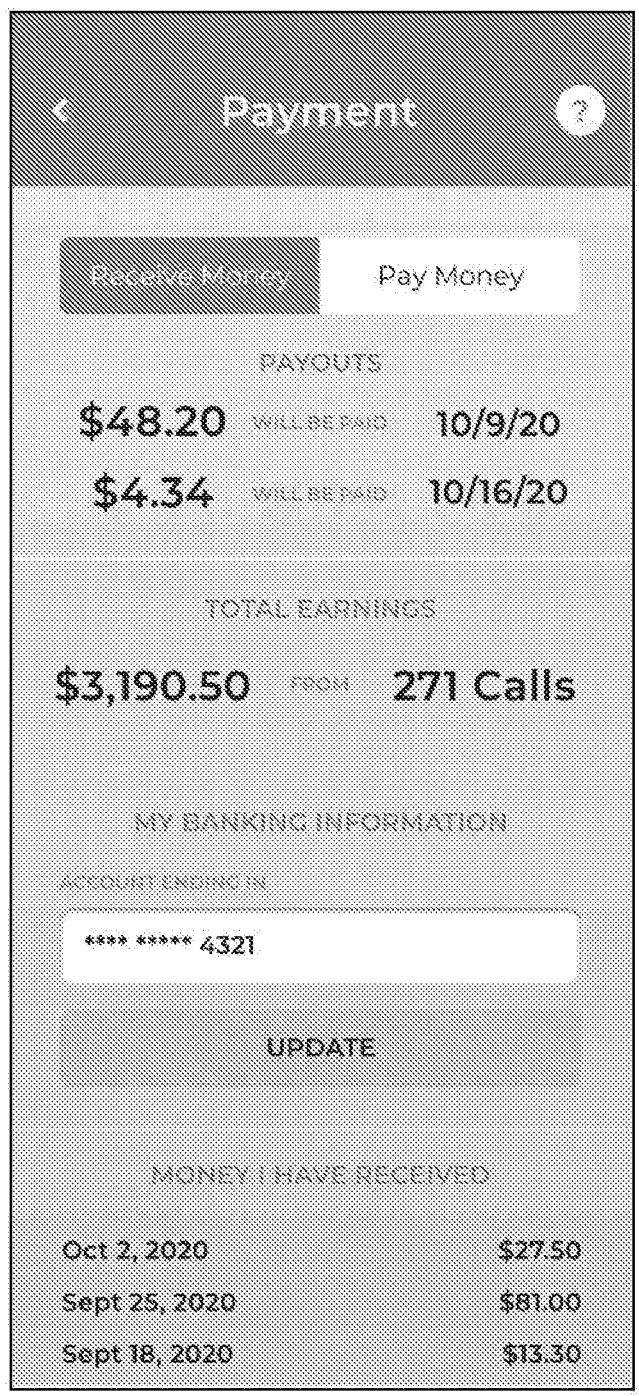

FIG. 51 is an example screen that shows a record of listener earnings.

Surge Pricing: In some scenarios the number of conference requesting callers may exceed the number of available listeners. The term "available" of course refers to preference settings submitted by listeners regarding preferred times of availability which are typically inputted via the dates and times available controls 308 of the listener dashboard 300. To anticipate the foregoing possibility, in some implementations, listeners may be given the opportunity to participate in surge pricing options in which a listener, in order to earn additional fees, can opt to participate in a listening session that is normally outside his or her preferred dates and times. In some implementations, a condition of participation in the Listener on Call system may require the registered listeners to agree to be automatically included in a back-up reserve of listeners at all times. In other implementations, a listener may be provided the option to participate. In any case, listeners may be incentivised to opt in to receive a relatively greater percentage of the listed fees. As a non-limiting example, a 30 minute session for listener Elizabeth is listed for $22.00. Out of the $22.00 fee, the Listener on Call System may reserve 15% or $3.30 to cover operations with Elizabeth receiving $18.70. Assuming a time where the number of callers exceed that of listeners with matching availability for that time, Elizabeth who would otherwise not be available, is placed on reserve status and is given the opportunity to participate and receive the entire listed amount of $22.00. In some implementations, the surge pricing may include fees paid to the participating listener that exceed the listed fee for that listener.

In some implementations, surge pricing may be time delimited or location delimited. In some cases, certain days and times may be known for an over abundance of conference requests. In such cases, surge pricing conditions may be limited to those days. In other cases, surge pricing may be applied to geographical areas that are known for an abundance of callers and surge pricing may be limited to such areas. In some implementations surge pricing opportunities may be limited or biased to listeners meeting a predetermined criteria such as high caller ratings or seniority. In some cases, based on the prevalence of requests, surge pricing opportunities may exist solely for certain identified topics; e.g., loneliness.

In some implementations, participating in surge pricing may include conditions. In one non-limiting example, the system may require a listener to be available for a minimum of 3 hours per day, or to have participated in a minimum number of caller conferences in order to participate. Surge pricing remuneration may be based on a multiple of the base rate, a percentage of the reserved system fee or a flat fee added to the base rate. In some implementations, raising the base rate may be an option for surge pricing. In some implementations, callers already having a predetermined number of listener interactions may not be presented the surge pricing fee increase by the system. In some cases certain callers may be flagged for certain reasons and the surge pricing waived. Persons having skill in the art and access to this disclosure will appreciate a variety of conditions that may be applied to surge pricing scenarios.

Example Scenario: Teresa is a college student finishing her senior year of college and finals are quickly approaching. She hasn't secured any job after college, her calculus class is extremely difficult and she is worried about not passing, and perhaps not even graduating. Teresa has recently gone through a bad breakup with her boyfriend. She feels like she can't talk to her parents because she doesn't want to disappoint them, and she feels like she can't talk to her friends because they have all secured jobs and life seems to be going great for them and she doesn't want to come off as a loser. The pressure of life and school continues to compound and her anxiety and stress increases daily. She doesn't have the means to pay $100+ an hour for licensed therapy and wishes she had someone with similar experience who could tell her it would all work out; someone immediately available. The stress continues and Teresa ultimately feels lost, with increasing anxiety and depression starting to affect her. Teresa makes the effort to seek out a school counselor, but the earliest appointment available is 7 business days, which is after her finals have already started. Teresa hears about a service available as a downloadable application or a cloud-based application. She proceeds to browse the application/site and decides to register as a user. Along with inputting her name, information regarding her topic and credit card info., the creation of the account would involve Teresa answering questions related to her listener preferences such as: listener gender, age, religion (if any preference), promo code, legal agreement/terms and conditions etc. In this case, Teresa indicates she prefers to speak only with Christian females at least 35 years of age.

When Teresa has completed the registration, or if she leaves the site and returns, the system suggests that she speak with a listener, and she is typically prompted by the system to select a preset time for listener/caller interaction which may have the following options: 30 min, 45 min, 1 hr. In this example, Teresa selects 30 min, and the system lets her know it is searching for matching listeners. The system informs Teresa that she may log out at this time and informs her that she will receive a text message when the system has matched her to available listeners.

Based on Teresa's preferences, the system matches listeners Mary and Jennifer and sends them notifications that there is a caller interested in talking to them. Mary and Jennifer open the notification and listen to Teresa's recorded message. They also see that Teresa selected 30 minutes as her minimum call time. Both Mary and Jennifer inform the system that they are available to speak with Teresa.

Teresa receives notification there are two listeners available to speak with her that match her preferences and have relevant experience with what she had previously indicated as her source of concern: anxiety/stress and embarrassment.

Teresa responds to the notification and is able to listen to both listeners' recordings about their experience with anxiety. Based on the recordings, she decides that Mary is a better fit, and selects to connect with Mary.

The system dials Mary and Teresa and enters them into a conference call.

The system notifies Jennifer that Teresa selected another listener and thanks her for her willingness to help.

Teresa and Mary speak for 25 minutes at which point a recorded voice notifies the parties there is 5 minutes remaining on the call, and asks Teresa if she would like to extend the call. The system may also play a chime prior to any voice notification or give other indication when there is one minute remaining on the call.

If Teresa decides to extend the call, typically by pressing a control, 15 minutes or any other predetermined increment is added to the conference call time.

Extending Call Time: Terms of service agreed to at time of registration state clearly that should a conference be extended, an additional charge over the base fee will be charged to the caller based on the listener rate. If an extended conference is terminated prior to reaching the 15 minute mark—e.g., the conference is terminated 2 minutes into the 15 minute (or a predetermined extension increment), the caller is typically assessed the fee covering the entire 15 minutes.

Fee Scale: Listeners begin with a base rate upon registration determined by the system. Base rates may be based on the listeners education and other factors.

Increases in listener rates may be figured according to listener tenure, caller ratings or feedback, listener education or credentials. Accordingly, listener rates may increase or decrease over time.

Caller Feedback: A caller may submit feedback regarding his or her interaction with a listener. The feedback may include free text and/or a selectable rating scale. Feedback whether positive or negative, is evaluated by the system administrator and decisions to counsel a listener or increase a listener's fee rate may in part depend on such feedback. If a caller gives a listener a bad rating or disputes charges, the recorded call and feedback will be sent to a dispute resolution center. All charges will be placed on hold pending resolution of the dispute. A panel of listeners may review the recording to come to an agreement regarding the validity of the dispute. If the dispute is deemed valid, the caller will not be charged. If the dispute is deemed invalid, the caller will be charged. Likewise, listeners may provide negative feedback regarding a caller if a caller is especially disrespectful. Listeners or callers having received multiple complaints may be excluded from the system at the discretion of the system administrator.

Emergencies: In some cases, a listener may determine that a caller may be in danger of hurting themselves or others. Contemporaneously with a session, a listener may contact a third party such as 911, a suicide crisis hotline or local support group via the IVR menu, and subsequently bridge the third party to the conference. The listener may inform the caller that he or she has contacted a third party. As described previously, conferences may be monitored by IA (508) which may form an objective measure for evaluating risk to the caller and inform the listener of same.

While the invention has been described by the various implementations described herein, it is not intended to limit the scope of the invention to the particular forms set forth. On the contrary, the invention is intended to cover such alternatives, modifications, and equivalents as may be included within the spirit and scope of the invention as defined by the following generic claims.

What is claimed is:

1. A method, executable by one or more computing devices, for providing an intelligently-matched therapeutic experience comprising the steps of:

in an application interface, providing therapeutic discussion topics determined by self-enrolling potential listeners who enter a life experience profile through a listener interface, a quantity of life experience profiles forming a catalog of life experience profiles;

using artificial intelligence (AI) to categorize elements of the life experience profiles to create at least an inventory of therapeutic topics;

providing a caller interface adapted to accept caller requested topics, capture the caller requested topics and using AI to interpret the semantic intent of the request in order to provide external alternate or supplemental resources when needed, and store the caller requested topics;

using AI to create a match between one or more of the caller requested topics one or more therapeutic topics from the inventory of therapeutic topics, at least one criteria for the match being intelligently matched shared experiences between the caller and one or more matched listeners;

presenting the caller a list of the one or more matched listeners according to listener availability;

the caller selecting one or more of the matched listeners;

scheduling a designated call time between the caller and one of the selected matched listeners;

at the designated call time, establishing a call between the caller and listener.

2. The method according to claim 1, further comprising making an audio recording obtained from the potential listeners as part of the life experience profile available to the caller as part of a listener selection process.

3. The method according to claim 1 further comprising human or intelligent assistance and feedback to the selected matched listener contemporaneously with the interaction between the caller and the selected matched listener.

4. The method according to claim 1 further comprising capturing caller requested topics and using artificial intelligence to interpret the semantic intent of the request as part of a caller-listener matching process.

5. The method according to claim 1 further comprising capturing real time monitoring of one or more caller-listener caller interactions with an intelligent assistant with consent of the caller.

6. The method according to claim 1 further comprising, presenting call requested topics not otherwise matched to potential listeners through the listener interface.

* * * * *